(12) United States Patent
Itokawa

(10) Patent No.: US 7,072,404 B2
(45) Date of Patent: Jul. 4, 2006

(54) DECODING APPARATUS, CONTROL METHOD THEREFOR, AND STORAGE MEDIUM

(75) Inventor: Osamu Itokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1173 days.

(21) Appl. No.: 09/836,252

(22) Filed: Apr. 18, 2001

(65) Prior Publication Data

US 2001/0033620 A1 Oct. 25, 2001

(30) Foreign Application Priority Data

Apr. 20, 2000 (JP) ............................ 2000-119611
Mar. 6, 2001 (JP) ............................ 2001-062469

(51) Int. Cl.
*H04N 7/12* (2006.01)
(52) U.S. Cl. ............ 375/240.28; 375/240; 375/240.01; 375/240.25
(58) Field of Classification Search ........... 375/240.28, 375/240.25, 240.11, 240, 240.01–240.06, 375/240.13–240.18
See application file for complete search history.

(56) References Cited

U.S. PATENT DOCUMENTS

| 5,418,568 | A | 5/1995 | Keith | 348/390 |
|---|---|---|---|---|
| 5,506,621 | A | 4/1996 | Ogasawara et al. | 348/396 |
| 5,530,477 | A | 6/1996 | Coelho | 348/390 |
| 5,604,539 | A | 2/1997 | Ogasawara et al. | 348/396 |
| 5,758,011 | A * | 5/1998 | Fujinami | 386/98 |
| 5,758,092 | A * | 5/1998 | Agarwal | 709/247 |
| 5,818,468 | A | 10/1998 | Le Cornec et al. | 345/521 |
| 6,052,205 | A * | 4/2000 | Matsuura | 358/426.12 |
| 6,118,821 | A * | 9/2000 | Matsumoto et al. | 375/240.25 |
| 6,246,720 | B1 * | 6/2001 | Kutner et al. | 375/240.25 |
| 6,307,899 | B1 * | 10/2001 | Starr et al. | 375/340 |
| 6,549,666 | B1 * | 4/2003 | Schwartz | 382/233 |
| 6,594,442 | B1 * | 7/2003 | Kageyama et al. | 386/96 |

FOREIGN PATENT DOCUMENTS

| EP | 0727912 | 8/1996 |
|---|---|---|
| EP | 0858228 | 8/1998 |

* cited by examiner

*Primary Examiner*—Allen Wong
*Assistant Examiner*—Dave Czekaj
(74) *Attorney, Agent, or Firm*—Fitzpatrick, Cella, Harper & Scinto

(57) ABSTRACT

This invention provides a decoding apparatus and control method therefor capable of eliminating visual flaws between frames even if several frames cannot be decoded. The first data is read out (S201), and decoding of the frame data starts (S202). During decoding processing, whether the processing time exceeds a predetermined limit time of decoding processing assigned to the packet is monitored (S204). If decoding processing does not end within the predetermined limit time, only decoded data are written in a memory (S213). This can maintain image continuity.

31 Claims, 34 Drawing Sheets

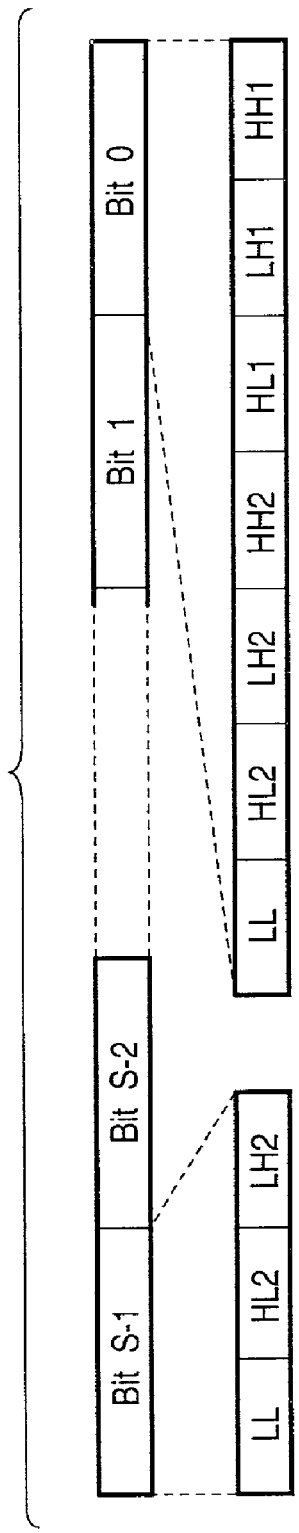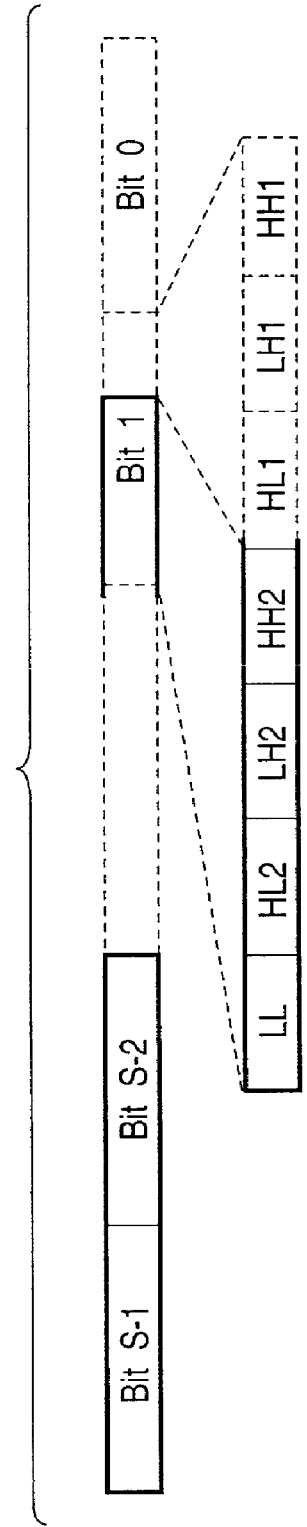

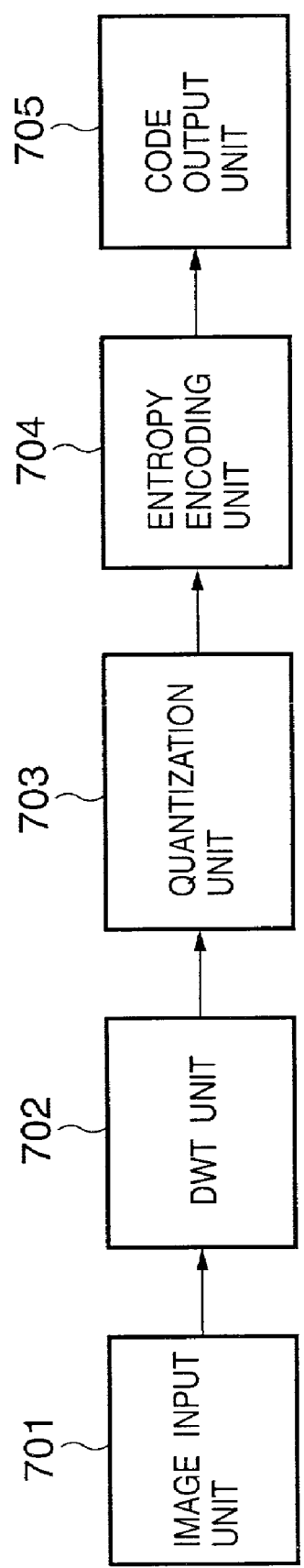

FIG. 8A
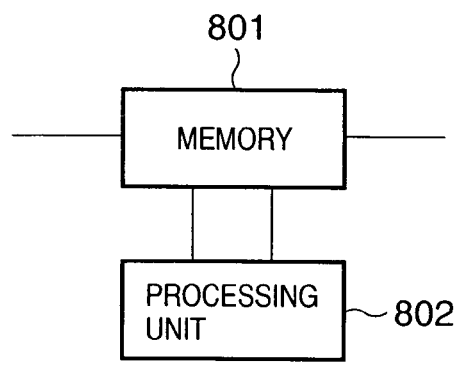
FIG. 8B
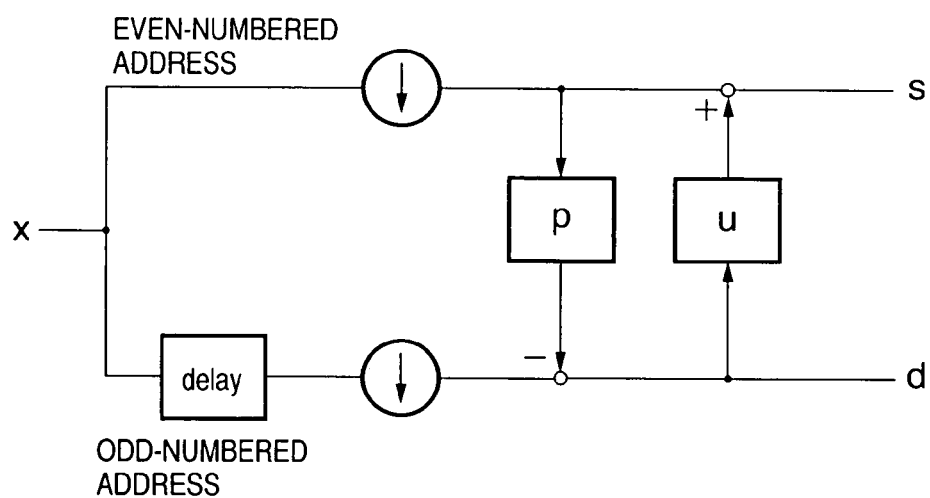
FIG. 8C
| LL | HL2 | HL1 |
|----|-----|-----|
| LH2 | HH2 | |
| LH1 | | HH1 |

FIG. 11A

| MH | TH0 | BS0 | TH1 | BS1 | ... | THn-1 | BSn-1 |

FIG. 11B

| IMAGE SIZE | TILE SIZE | NUMBER OF COMPONENTS | COMPONENT INFORMATION |

FIG. 11C

| TILE LENGTH | ENCODING PARAMETER |

FIG. 11D

Bit Plane S-1 | Bit Plane S-2 | Bit Plane 0

| LL | HL2 | LH2 | LL | ... | LL | HL2 | LH2 | HH2 | HL1 | LH1 | HH1 |

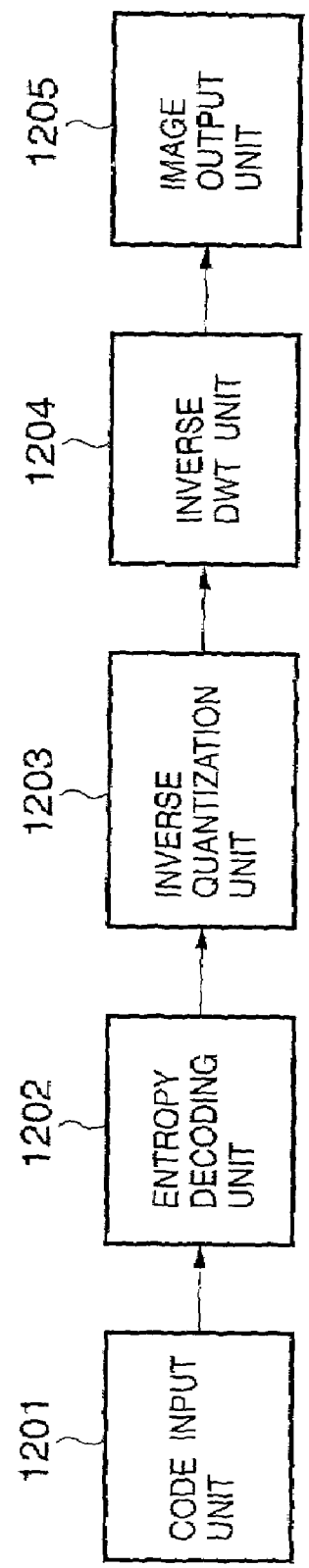

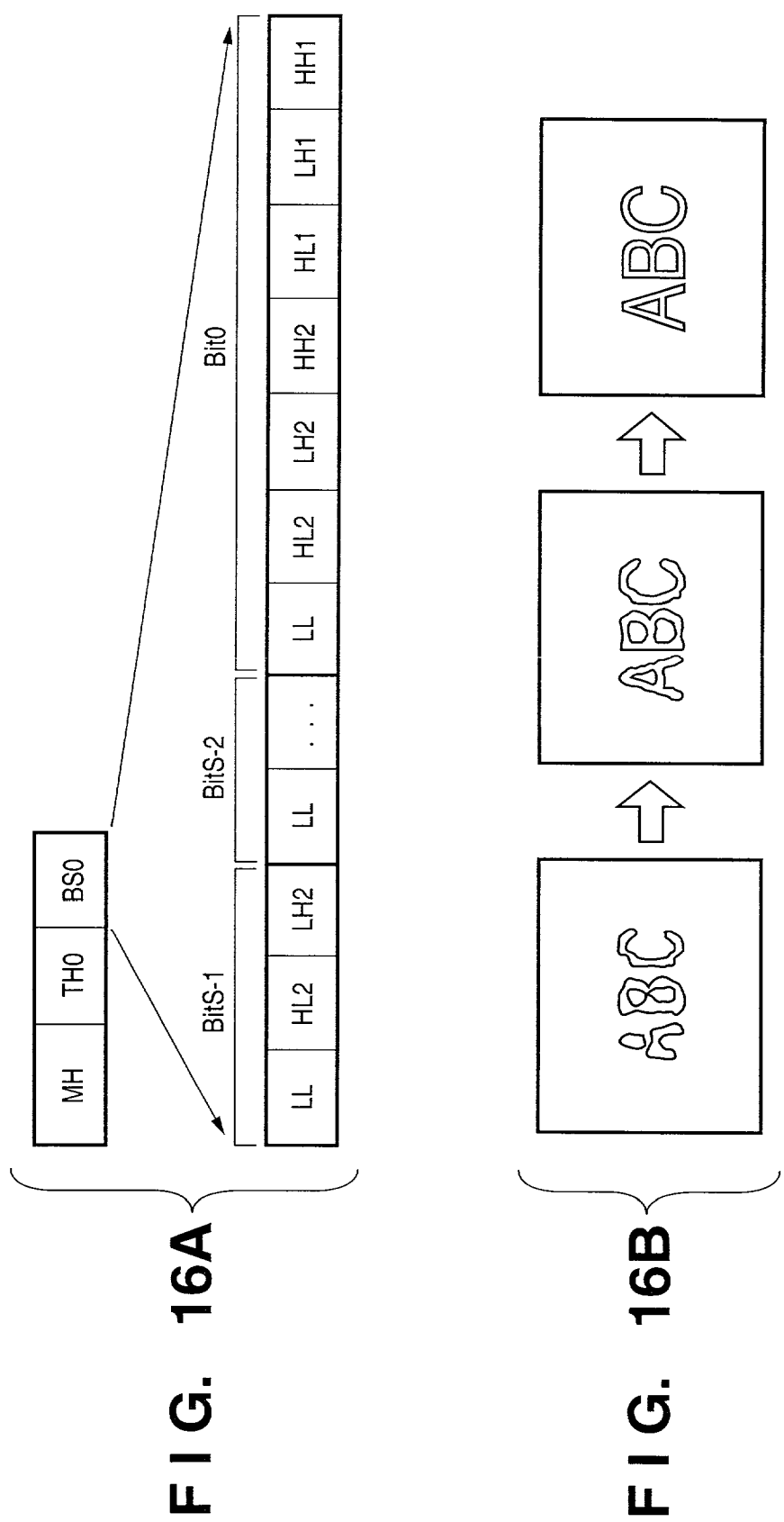

FIG. 21A

| T1 | T2 | T3 |
|----|----|----|
| T4 | T5 | T6 |
| T7 | T8 | T9 |

FIG. 21B

| T6 | T1 | T8 |
|----|----|----|
| T7 | T5 | T3 |
| T2 | T9 | T4 |

FIG. 21C

| T7 | T2 | T9 |
|----|----|----|
| T8 | T6 | T4 |
| T3 | T1 | T5 |

FIG. 21D

| T8 | T3 | T1 |
|----|----|----|
| T9 | T7 | T5 |
| T4 | T2 | T6 |

FIG. 21E

| T9 | T4 | T2 |
|----|----|----|
| T1 | T8 | T6 |
| T5 | T3 | T7 |

FIG. 21F

| T1 | T5 | T3 |
|----|----|----|
| T2 | T9 | T7 |
| T6 | T4 | T8 |

FIG. 21G

| T2 | T6 | T4 |
|----|----|----|
| T3 | T1 | T8 |
| T7 | T5 | T9 |

FIG. 21H

| T3 | T7 | T5 |
|----|----|----|
| T4 | T2 | T9 |
| T8 | T6 | T1 |

FIG. 21I

| T4 | T8 | T6 |
|----|----|----|
| T5 | T3 | T1 |
| T9 | T7 | T2 |

FIG. 21J

| T5 | T9 | T7 |
|----|----|----|
| T6 | T4 | T2 |
| T1 | T8 | T3 |

FIG. 32

| PLAYBACK SPEED | LOWEST GUARANTEED IMAGE QUALITY |
|---|---|
| ~ 1X SPEED (SLOW PLAYBACK) | UPPER 8 BITS |
| 1X SPEED ~ 2X SPEED | UPPER 8 BITS |
| 2X SPEED ~ 3X SPEED | UPPER 7 BITS |
| 3X SPEED ~ 4X SPEED | UPPER 6 BITS |
| 4X SPEED ~ 5X SPEED | UPPER 5 BITS |
| 5X SPEED ~ 6X SPEED | UPPER 4 BITS |
| 6X SPEED ~ | UPPER 3 BITS |

FIG. 33

| PLAYBACK SPEED | SMALLEST GUARANTEED IMAGE SIZE |
|---|---|
| ~ 1X SPEED (SLOW PLAYBACK) | FULL IMAGE SIZE |
| 1X SPEED ~ 3X SPEED | FULL IMAGE SIZE |
| 3X SPEED ~ 6X SPEED | 1/4 IMAGE SIZE |
| 6X SPEED ~ | 1/8 IMAGE SIZE |

DECODING APPARATUS, CONTROL METHOD THEREFOR, AND STORAGE MEDIUM

FIELD OF THE INVENTION

The present invention relates to an apparatus of decoding a moving picture, a control method therefor, and a storage medium.

BACKGROUND OF THE INVENTION

As a color still picture encoding method, JPEG, an international standard, has widely been known. As a compression method having a larger number of functions than JPEG, a new encoding method based on wavelet transform, i.e., so-called JPEG 2000 is being standardized.

Further, attempts are made to apply the wavelet transform to moving picture encoding.

As the processing speed of recent CPUs increases, processing of a moving picture compressed using the wavelet transform technique can be realized. In a moving picture, data are successive so decoding processing must be completed within a predetermined time.

SUMMARY OF THE INVENTION

The present invention has been made to overcome the conventional drawbacks, and has as its object to eliminate visible flaws between frames even if several frames cannot be decoded.

To achieve the above object, for example, a decoding apparatus of the present invention has the following arrangement.

According to the present invention, the foregoing object is attained by providing a decoding apparatus for decoding an input signal which includes a code stream and data having time management information about decoding of the code stream, comprising: buffering means for buffering the input signal; decoding means for reading out the input signal from the buffering means, decoding the input signal, and writing decoded data in a predetermined memory; output means for outputting the decoded data from the predetermined memory; and control means for controlling the buffering means and the decoding means on the basis of the time management information.

According to another aspect of the present invention, the foregoing object is attained by providing a method of controlling a decoding apparatus for decoding an input signal which includes a code stream and data having time management information about decoding of the code stream, comprising: a buffering step of buffering the input signal in a predetermined buffer; a decoding step of reading out the input signal from the predetermined buffer, decoding the input signal, and writing decoded data in a predetermined memory; a output step of outputting the decoded data from the predetermined memory; and the control step of controlling at least one of the buffering step, the decoding step, and the output step on the basis of the time management information.

In still another aspect of the present invention, the foregoing object is attained by providing a storage medium which stores program codes functioning as a decoding apparatus for decoding an input signal which includes a code stream and data having time management information about decoding of the code stream, comprising: a program code of the buffering step of buffering the input signal in a predetermined buffer; a program code of the decoding step of reading out the input signal from the predetermined buffer, decoding the input signal, and writing decoded data in a predetermined memory; a program code of the output step of outputting the decoded data from the predetermined memory; and a program code of the control step of controlling at least one of the buffering step, the decoding step, and the output step on the basis of the time management information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A is a view showing an entire encoded stream which should be originally decoded in the first embodiment of the present invention;

FIG. 4B is a view showing data decoded partway owing to a short processing time in the first embodiment of the present invention;

FIG. 7 is a block diagram showing the arrangement of a conventional encoder;

FIG. 8A is a block diagram showing the arrangement of a discrete wavelet transform unit 702;

FIG. 8B is a block diagram showing the arrangement of a processing unit 802 in FIG. 8A;

FIG. 8C is a view showing the layout of 2-level transform coefficient groups obtained by two-dimensional transform processing;

FIG. 11A is a view showing the entire structure of a code stream different from that of FIG. 10A;

FIG. 11B is a view showing a structure of the main header MH;

FIG. 11C is a view showing a structure of the tile header TH;

FIG. 11D is a view showing a structure of the bit stream;

FIG. 12 is a block diagram showing the arrangement of a conventional decoder;

FIG. 16A is a view showing a structure of a code stream different from that of FIG. 15A;

FIG. 16B is a view showing an example of a displayed image;

FIG. 21A is a view showing an example of dividing one frame into nine tiles in the third embodiment of the present invention;

FIGS. 21B to 21J are views showing examples of shuffling tiles according to the third embodiment of the present invention;

FIG. 32 is a table showing an example of a table representing the relationship between the playback speed of high-speed playback and the lowest image quality in the second embodiment of the present invention;

FIG. 33 is a table showing an example of a table representing the relationship between the playback speed of high-speed playback and the smallest image size in the fifth embodiment of the present invention.

DETAILED DESCRIPTION OF THE PREFERRED EMBODIMENTS

Figure 1:
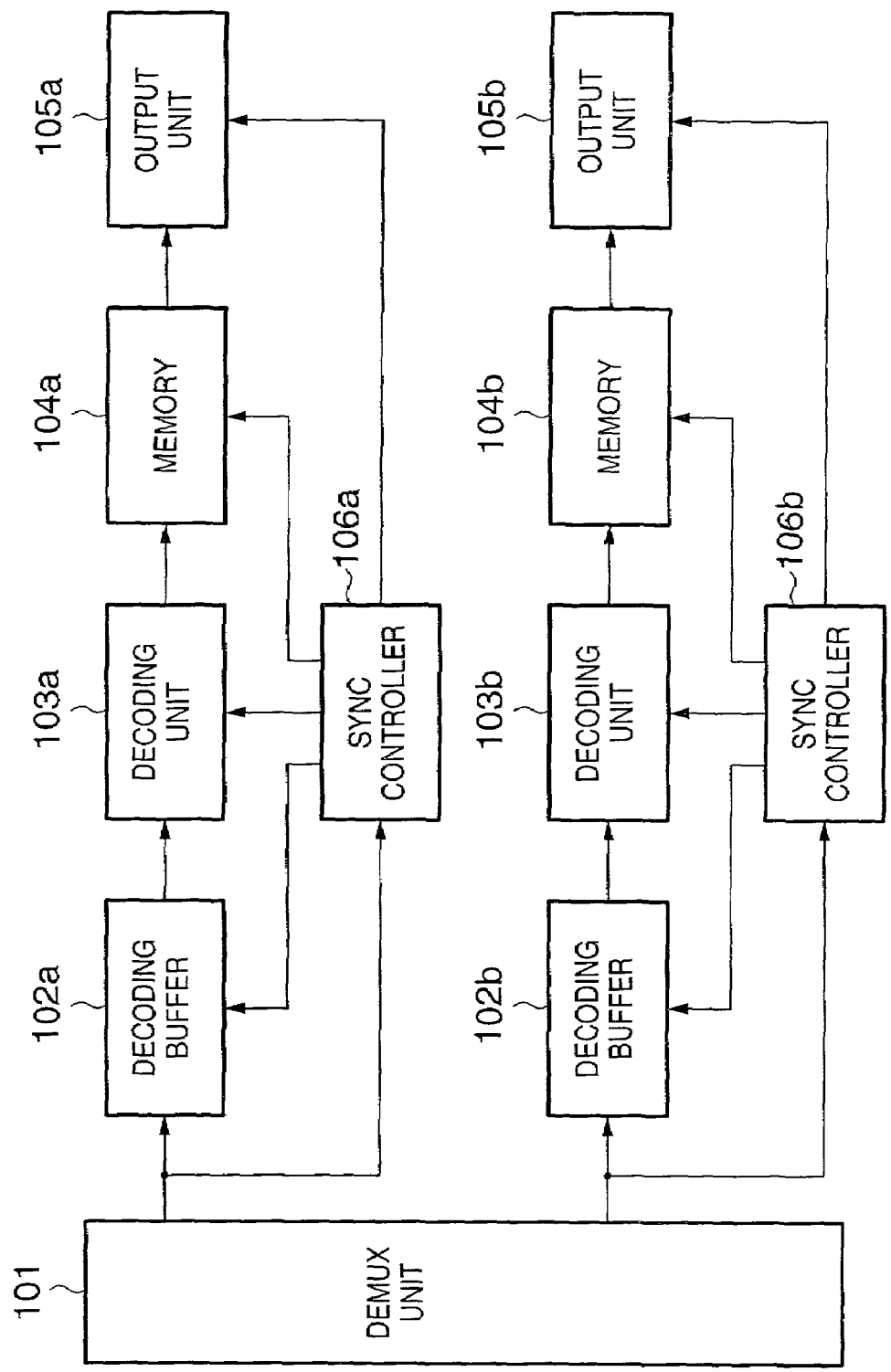
FIG. 1 is a block diagram showing the schematic arrangement of a decoding apparatus in the first embodiment of the present invention.

Preferred embodiments of the present invention will be described in detail below with reference to the accompanying drawings. Program codes complying with a flow chart described in each embodiment are stored in a memory formed from a RAM or ROM in a decoding apparatus according to the embodiment, and read out and executed by a CPU.

First Embodiment

A conventional encoding method based on the wavelet transform will be explained.

(Encoder)

In FIG. 7 which is a block diagram showing a conventional encoder, reference numeral 701 denotes an image input unit; 702, a discrete wavelet transform (DWT) unit; 703, a quantization unit; 704, an entropy encoding unit; and 705, a code output unit.

Pixel signals forming an image to be encoded are input to the image input unit 701 in a raster scan order, and an output from the image input unit 701 is input to the discrete wavelet transform unit 702. In the following description, an image signal expresses a monochrome multilevel image. To encode a plurality of color components, like a color image, R, G, and B color components or luminance and chromaticity components are compressed as a single color component.

The discrete wavelet transform unit 702 performs two-dimensional discrete wavelet transform processing for an input image signal, and calculates and outputs a transform coefficient. FIG. 8A shows the basic arrangement of the discrete wavelet transform unit 702 in which input image signals are stored in a memory 801, sequentially read out and subjected to transform processing by a processing unit 802, and rewritten in the memory 801. The processing unit 802 has a processing arrangement shown in FIG. 8B. In FIG. 8B, the input image signal is separated into even- and odd-numbered address signals by a combination of a delay element and down samplers, and subjected to filter processing by two filters p and u. Reference symbols s and d in FIG. 8B denote low- and high-pass coefficients in 1-level decomposition for one-dimensional image signals, and are calculated by $$d(n)=x(2*n+1)-\text{floor}((x(2*n)+x(2*n+2))/2) \quad (1)$$

$$s(n)=x(2*n)+\text{floor}((d(2-1)+d(n))/4) \quad (2)$$

where x(n) is the image signal to be transformed, and floor(r) is a maximum integer value smaller than r.

By the above processing, image signals undergo one-dimensional discrete wavelet transform processing. The two-dimensional discrete wavelet transform sequentially executes a one-dimensional transform in the horizontal and vertical directions of an image. Details of the two-dimensional discrete wavelet transform are well known, and a description thereof will be omitted.

FIG. 8C shows the layout of 2-level transform coefficient groups obtained by two-dimensional transform processing. An image signal is decomposed into coefficient streams HH1, HL1, LH1, ..., LL having different frequency bands. In the following description, these coefficient streams will be called subbands. The coefficient of each subband is output to the subsequent quantization unit 703.

The quantization unit 703 quantizes the input coefficient at a predetermined quantization step, and outputs an index (quantization index) for the quantized value. The quantization unit 703 executes quantization by $$q=\text{sign}(c)\text{floor}(abs(c)/\Delta) \quad (3)$$

$$\text{sign}(c)=1; c>=0 \quad (4)$$

$$\text{sign}(c)=-1; c<=0 \quad (5)$$

where c is a coefficient to be quantized, and floor(X) is a maximum integer value smaller than X. The $\Delta$ value can be 1. In this case, no quantization is actually done, and a transform coefficient input to the quantization unit 703 is directly output to the subsequent entropy encoding unit 704.

The entropy encoding unit 704 decomposes the input quantization index into bit planes, performs binary arithmetic encoding in units of bit planes, and outputs a code stream.

Figure 9:
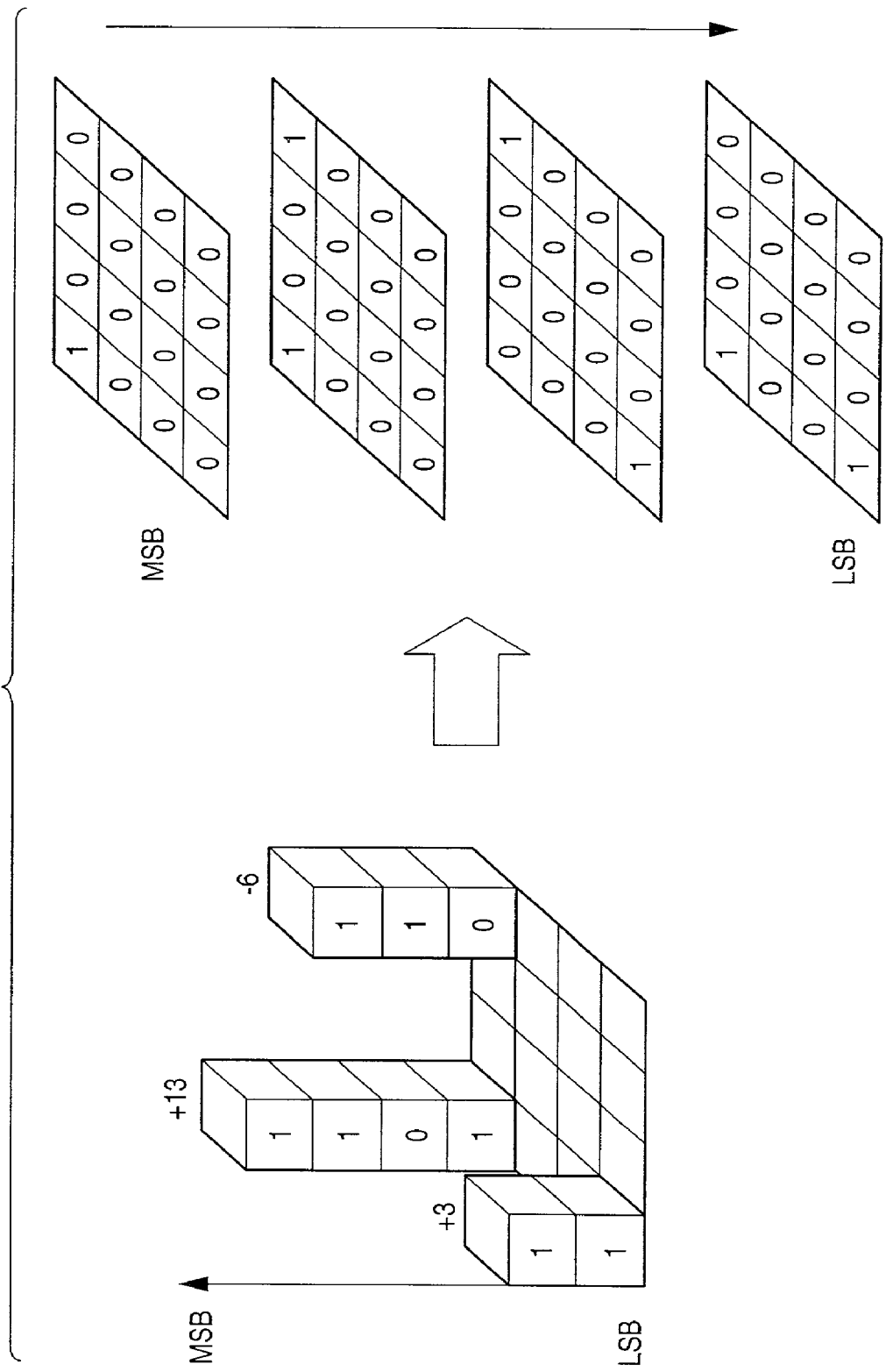
FIG. 9 is a view for explaining the operation of an entropy encoding unit 704.

FIG. 9 is a view for explaining the operation of the entropy encoding unit 704. In this example, three nonzero quantization indices exist in the regions of a 4×4 subband, and have values of +13, −6, and +3, respectively. The entropy encoding unit 704 scans the respective subband regions to obtain a maximum value M among all the quantization indices, and calculates the number S of bits necessary for expressing the maximum quantization index by $$S=ceil(\log_2(abs(M))) \quad (6)$$

where ceil(x) is a minimum integer value among integers equal to or larger than x. In FIG. 9, the maximum quantization index value M is 13. From equation (6), S is 4, and 16 quantization indices in a sequence are processed in units of four bit planes, as shown in FIG. 9.

The entropy encoding unit 704 executes binary arithmetic encoding for the respective bits of the most significant bit plane (represented by MSB in FIG. 9), and outputs them as a bit stream. The entropy encoding unit 704 switches the bit plane to one lower by one level, and then encodes the respective bits of the bit plane and outputs them to the code output unit 705 until the target bit plane reaches the least significant bit plane (represented by LSB in FIG. 9). At this time, the code of each quantization index is entropy-encoded immediately after a nonzero bit is first detected in bit plane scan.

Figure 10A:
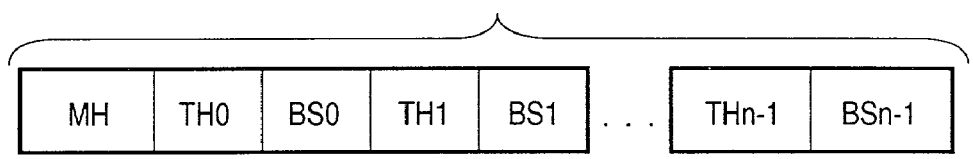
FIG. 10A is a view showing the structure of an entire code stream.
Figure 10B:
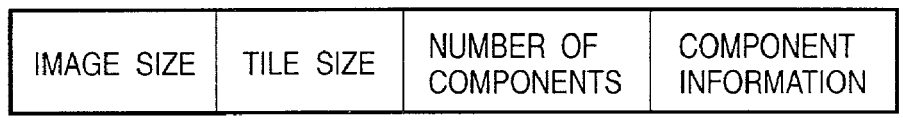
FIG. 10B is a view showing a structure of a main header MH.

FIG. 10A is a schematic view showing the structure of a code stream generated and output in this manner. In FIG. 10A, MH represents a main header; TH, a tile header; and BS, a bit stream. As shown in FIG. 10B, the main header MH is constituted by pieces of information including the size of an image to be encoded (the numbers of pixels in the horizontal and vertical directions), the size of a tile obtained by dividing the image into a plurality of rectangular regions, the number of components representing the number of color components, and component information representing the size of each component and the bit precision. When the image is not divided into tiles, the tile and image sizes take the same values. When the target image is a monochrome multilevel image, the number of components is 1.

Figure 10C:
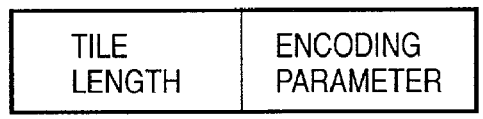
FIG. 10C is a view showing a structure of a tile header TH.

FIG. 10C shows the structure of the tile header TH. The tile header TH is constituted by pieces of information representing a tile length including the bit stream length and header length of a tile, and an encoding parameter for the tile. The encoding parameter includes the level of discrete wavelet transform and the type of filter.

Figure 10D:
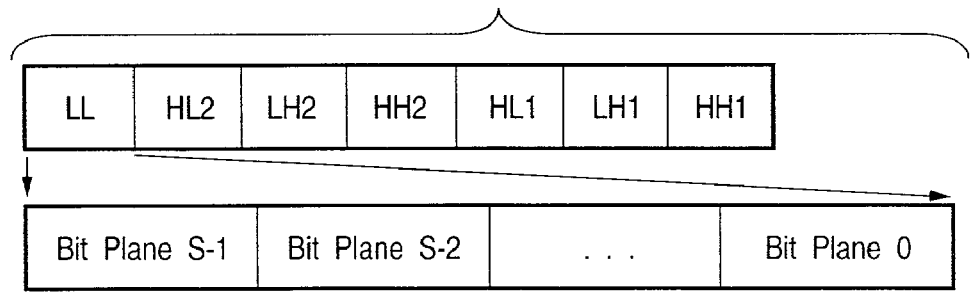
FIG. 10D is a view showing a structure of a bit stream.

FIG. 10D shows the structure of the bit stream. In FIG. 10D, bit streams are gathered in units of subbands and arranged in an ascending order of resolution from the bit stream of a subband whose resolution is the lowest. Bit planes are arranged from an upper bit plane to a lower bit plane in each subband, and codes are arranged in each bit plane.

FIG. 11A shows the entire structure of a code stream different from that of FIG. 10A. MH represents a main header; TH, a tile header; and BS, a bit stream. As shown in FIG. 11B, the main header MH is constituted by pieces of information including the size of an image to be encoded (the numbers of pixels in the horizontal and vertical directions), the size of a tile obtained by dividing the image into a plurality of rectangular regions, the number of components representing the number of color components, and component information representing the size of each component and the bit precision. When the image is not divided into tiles, the tile and image sizes take the same values. When the target image is a monochrome multilevel image, the number of components is 1.

FIG. 11C shows the structure of the tile header TH. The tile header TH is constituted by pieces of information representing a tile length including the bit stream length and header length of a tile, and an encoding parameter for the tile. The encoding parameter includes the level of discrete wavelet transform and the type of filter. FIG. 11D shows the structure of the bit stream. In FIG. 11D, bit streams are gathered in units of bit planes and arranged from an upper bit plane to a lower bit plane. In each bit plane, the encoding results of the bit planes of quantization indices in each subband are sequentially arranged in units of subbands. In FIG. 11D, S represents the number of bits necessary for expressing the maximum quantization index. A code stream generated in this manner is output to the code output unit 705.

The compression ratio of an entire image to be encoded can be controlled by changing the quantization step Δ. As another method, the entropy encoding unit 704 can also control (discard) the lower bit of a bit plane to be encoded in accordance with a necessary compression ratio. In this case, all the bit planes are not encoded, bit planes corresponding in number to a desired compression ratio are encoded from an upper bit plane, and the encoded bit planes are included in the final code stream.

(Decoder)

A method of decoding a code stream attained by the above-described encoder will be explained.

FIG. 12 is a block diagram showing the arrangement of the decoder. Reference numeral 1201 denotes a code input unit; 1202, an entropy decoding unit; 1203, an inverse quantization unit; 1204, an inverse discrete wavelet transform unit; and 1205, an image output unit.

The code input unit 1201 receives the above-described code stream, analyzes the header included in it, extracts a parameter necessary for subsequent processing, and if necessary, controls the processing flow or outputs the parameter to the subsequent processing unit. The bit stream included in the code stream is output to the entropy decoding unit 1202.

Figure 13:
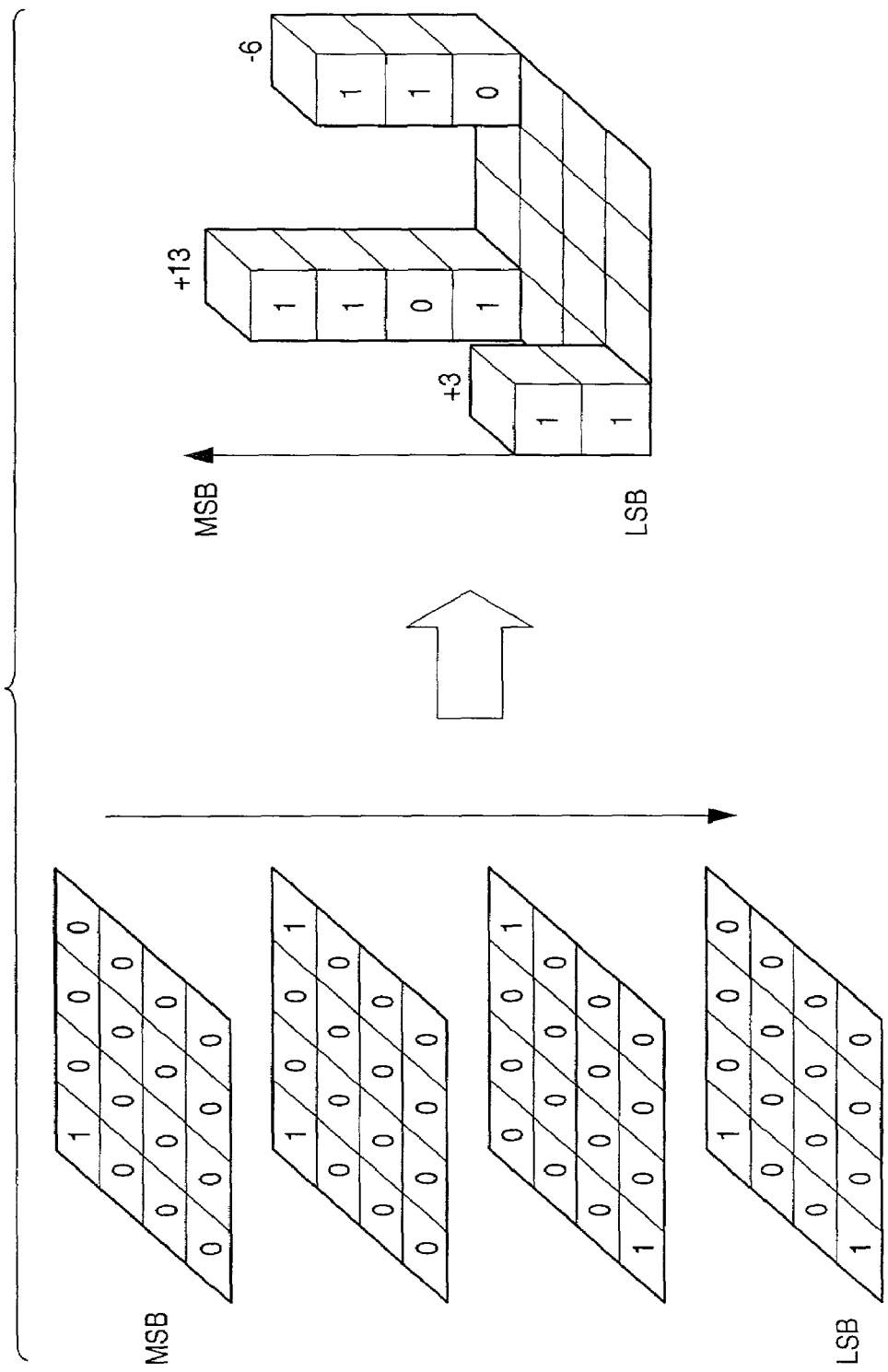
FIG. 13 is a view for explaining the operation of an entropy decoding unit 1202.

The entropy decoding unit 1202 decodes the bit stream in units of bit planes, and outputs the decoded stream. This decoding procedure is shown in FIG. 13. FIG. 13 shows the flow of sequentially decoding one region of a subband to be decoded in units of bit planes and finally decoding the quantization index. Bit planes are decoded in the direction indicated by an arrow in FIG. 13. The decoded quantization index is output to the inverse quantization unit 1203.

The inverse quantization unit 1203 reconstructs the discrete wavelet transform coefficient from the input quantization index by:

$$c' = \Delta * q \; ; \; q \neq 0 \qquad (7)$$

$$c' = 0; \; q = 0 \qquad (8)$$

where q is the quantization index, Δ is the quantization step and has the same value as that used in encoding, and c' is the decoded transform coefficient obtained by decoding the coefficient s or d in encoding. The transform coefficient c' is output to the subsequent inverse discrete wavelet transform unit 1204.

Figure 14A:
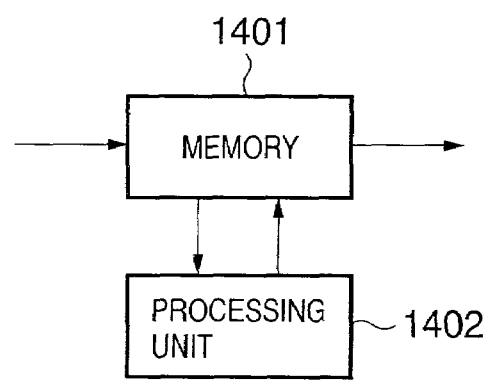
FIG. 14A is a block diagram showing the arrangement of an inverse discrete wavelet transform unit 1204.
Figure 14B:
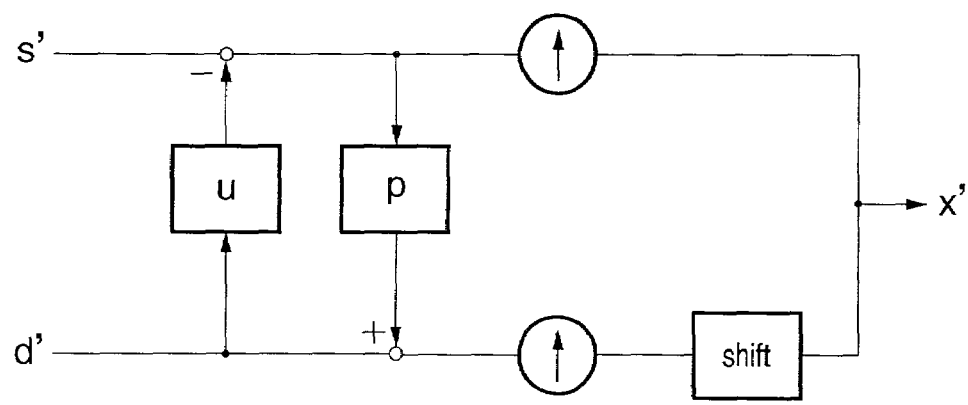
FIG. 14B is a block diagram showing the arrangement of a processing unit 1402 in FIG. 14A.

FIG. 14A is a block diagram showing the arrangement of the inverse discrete wavelet transform unit 1204. In FIG. 14A, the input transform coefficient is stored in a memory 1401. A processing unit 1402 executes the two-dimensional inverse discrete wavelet transform by performing a one-dimensional inverse discrete wavelet transform, sequentially reading out transform coefficients from the memory 1401, and processing them. The two-dimensional inverse discrete wavelet transform is executed by procedures reverse to those of the forward transform. Details of the two-dimensional inverse discrete wavelet transform are well known, and a description thereof will be omitted. FIG. 14B shows the processing block of the processing unit 1402. Input transform coefficients are subjected to two filter processes by u and p, up-sampled, and superimposed on each other, thereby outputting an image signal x'. These processes are performed by $$x'(2*n) = s'(n) - \text{floor}((d'(n-1) + d'(n))/4) \qquad (9)$$

$$x'(2*n+1) = d'(n) + \text{floor}((x'(2*n) + x'(2*n+2))/2) \qquad (10)$$

In this case, the forward and backward discrete wavelet transform processes by equations (1), (2), (9), and (10) satisfy perfect reconstruction conditions. Thus, the decoded image signal x' coincides with the signal x of the original image as far as the quantization step Δ is 1 and all the bit planes are decoded in bit plane decoding.

By this processing, the image is restored and output to the image output unit 1205. The image output unit 1205 may be an image display device such as a monitor or a storage device such as a magnetic disk.

Figure 15A:
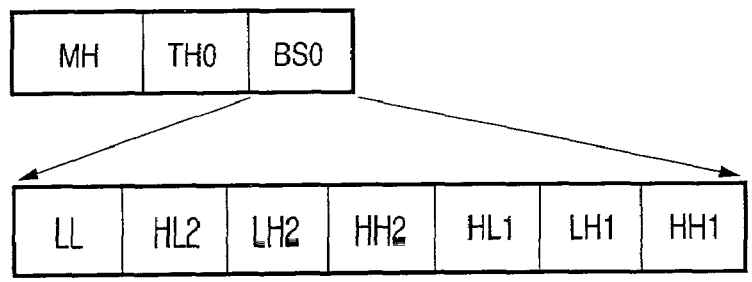
FIG. 15A is a view showing a structure of a code stream.
Figure 15B:
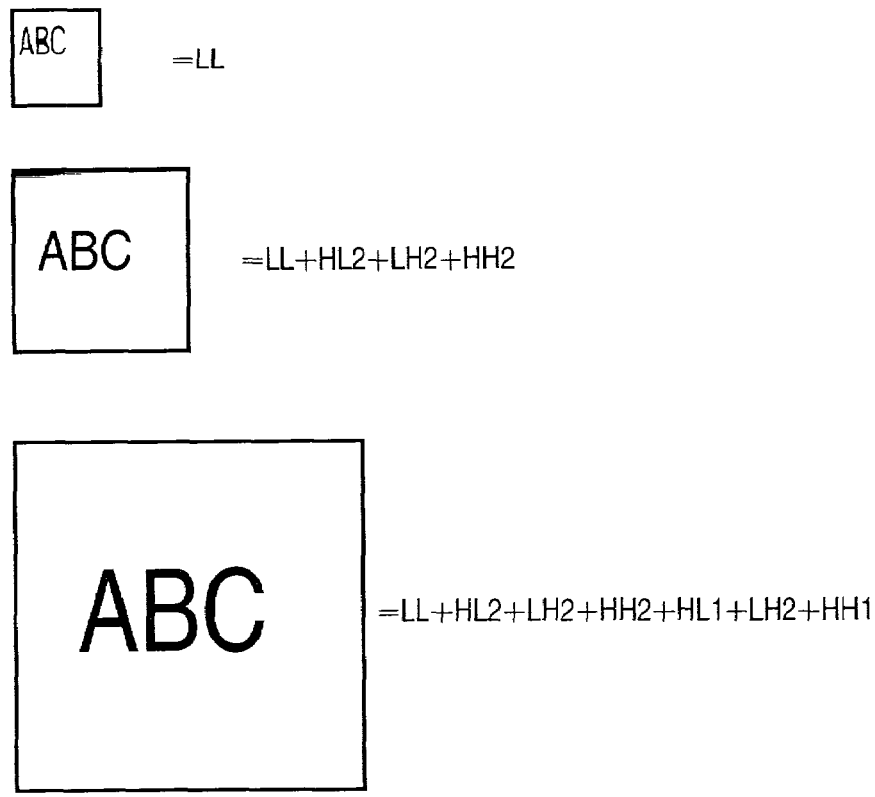
FIG. 15B is a view showing the relationship between each subband and the size of a displayed image.

The image display form in restoring and displaying an image by the above-mentioned procedures will be described with reference to FIGS. 15A and 15B. FIG. 15A shows an example of a code stream whose basic structure is based on FIGS. 10A and 10D. When an entire image is set as one tile, the code stream includes only one tile header and one bit stream. As shown in FIG. 15A, codes are arranged in a bit stream BS0 in an ascending order of resolution from LL which is a subband corresponding to the lowest resolution.

The decoder sequentially reads bit streams, and when decoding codes corresponding to each subband, displays the image. FIG. 15B shows the correspondence between each subband and the size of a displayed image. In this example, the two-dimensional discrete wavelet transform is done to two levels. When only LL is decoded and displayed, an image made up of pixels reduced in number to ¼ the original image in the horizontal and vertical directions is restored. When bit streams are further read and all the subbands of level 2 are restored and displayed, an image made up of pixels reduced in number to ½ the original image in the respective directions is restored. When all the subbands of level 1 are restored and displayed, an image having the same number of pixels as that of the original image is restored.

Another image display form in restoring and displaying an image by the above-mentioned procedures will be described with reference to FIGS. 16A and 16B. FIG. 16A shows an example of a code stream whose basic structure is based on FIGS. 11A and 11D. When an entire image is set as one tile, the code stream includes only one tile header and one bit stream. As shown in FIG. 16A, codes are arranged from the most significant bit plane to the least significant bit plane.

The decoder sequentially reads bit streams, and when decoding the codes of each bit plane, displays the image. FIG. 16B shows an example of a change in the quality of a displayed image when decoding is sequentially done from an upper bit plane. When only the upper bit plane is decoded, only the feature of the entire image is displayed. As lower bit planes are decoded, the image quality is improved stepwise. When the quantization step Δ is 1 in quantization, the image displayed after all the bit planes are decoded is completely the same as the original image.

In this prior art, lower bit planes to be decoded by the entropy decoding unit 1202 can be limited (ignored) to decrease the encoded data amount to be received or processed, thereby controlling the compression ratio. This enables obtaining a decoded image having a desired image quality from only a necessary amount of encoded data. The prior art can also realize reversible encoding/decoding in which a restored image coincides with its original image when the quantization step Δ is 1 in quantization and all the bit planes are decoded in decoding.

Figure 17:
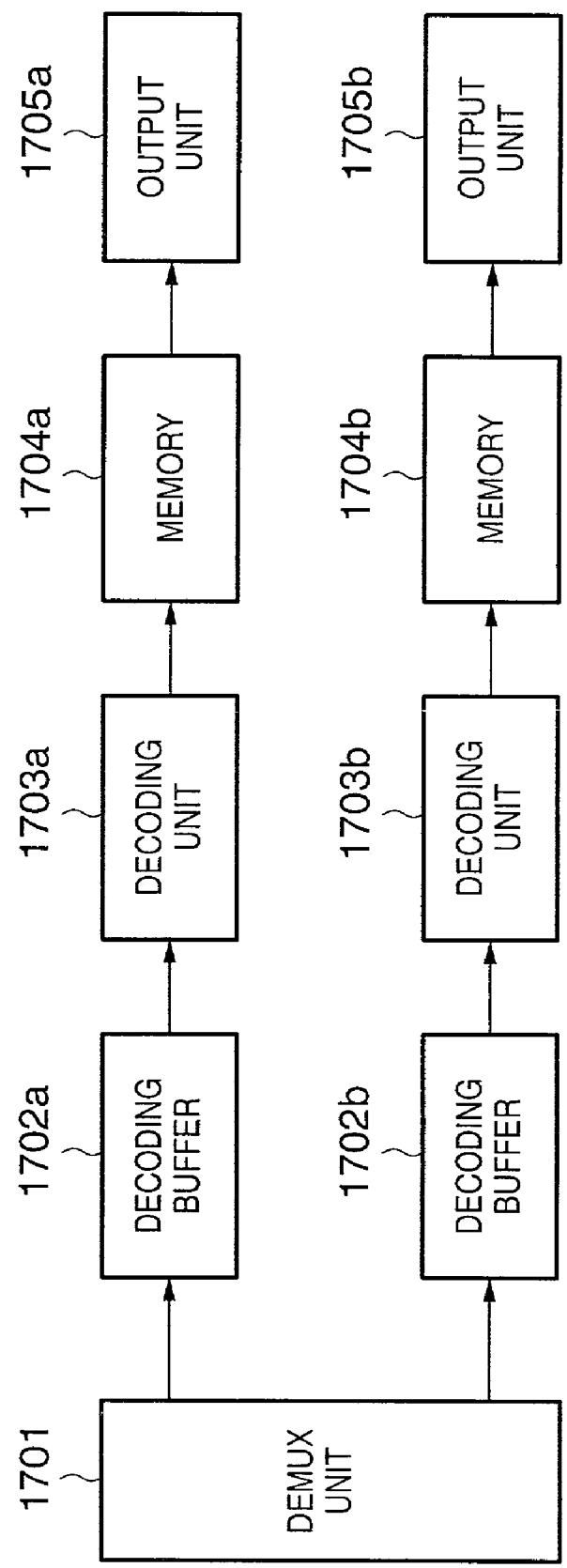
FIG. 17 is a block diagram showing a conventional decoding apparatus of decoding multiplexed video and audio data.

FIG. 17 shows a conventional decoding apparatus of decoding multiplexed video and audio data. A DEMUX unit 1701 demultiplexes video and audio streams. The data unit output to each of encoding buffers 1702a and 1702b is a sync processing unit generally called an access unit. Letting a frame be a processing unit, the processing proceeds such that the encoding buffers 1702a and 1702b receive data in units of frames, decoding units 1703a and 1703b decode the data, the decoded data are written in memories 1704a and 1704b, and output units 1705a and 1705b display the data. The access unit includes, at the header, time management information, which is used for sync management.

Figure 18A:
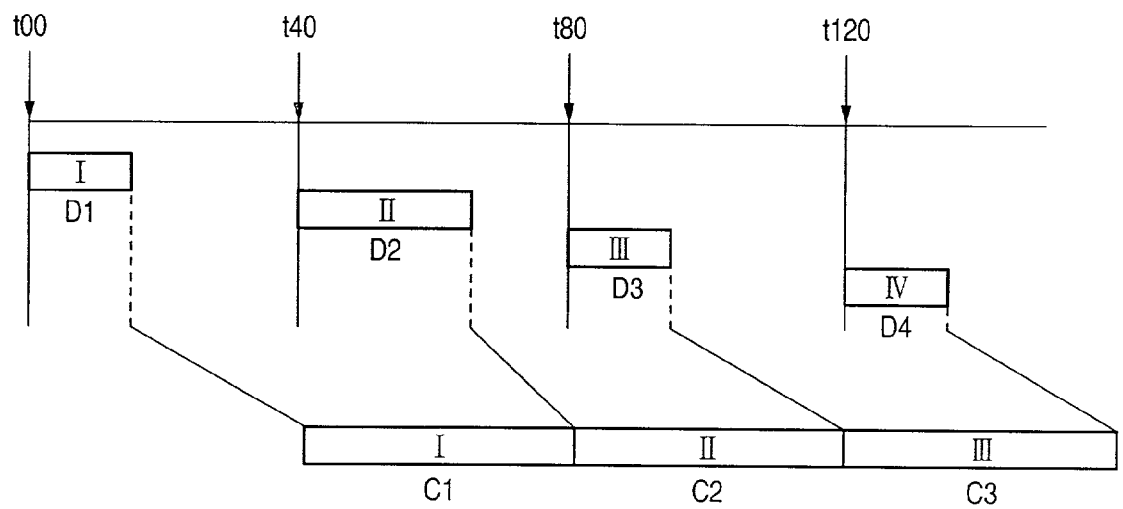
FIG. 18A is a view for explaining conventional processing from reception to display of a packet.

FIG. 18A shows timings from reception to display of a packet. The first packet received at timing t=t00 takes a time D1 for decoding processing and is displayed for a time C1. Similarly, the second packet received at timing t=t40 takes a time D2 for decoding processing and is displayed for a time C2. If decoding processing ends within a predetermined time, the same data as that on the encoding side is decoded with a predetermined delay time. For descriptive convenience, the buffering size is one frame. Processing must end till the read timing of the next frame data, which is the decoding limit time. In this case, the limit time described at the header is (t40–t00), and the condition of displaying the first frame is D1≦(t40–t00). In general, the processing time is designed to be much shorter than the limit time. However, when decoding is done by software installed in a general-purpose computer, 100% of the CPU performance cannot always be assigned to this processing due to execution of another application. To read data once stored in a hard disk at a high speed, 2×-speed playback requires two or more times the processing speed, and 3×-speed playback requires three or more times the processing speed. At this time, time management information within a packet header must be rewritten in accordance with the playback speed, and then processing is executed.

A problem when the processing speed is insufficient will be explained with reference to FIG. 18B by exemplifying 2×-speed playback. The first packet received at timing t=t00 takes the time D1 for decoding processing and is displayed for the time C1. At this time, the processing limit time for the first packet is (t20–t00) or (t40–t00)/2. Since D1≦(t40–t00), the first packet can be displayed. However, as for the second packet received at timing t=t20, the time D2 for decoding processing is D2>(t40–t20), so decoding processing of the next packet must start before decoding processing of the second packet ends. In this case, data which is being decoded is not written in the memory and holds its state until the next write is done. That is, the first data is kept displayed, and the display time is the time C2 during which the second data should be displayed. The third packet received at timing t=t40 takes the time D3 for decoding processing. The result can be displayed because D3≦(t60–t40), and the third packet is displayed for a time C3. As for the fourth packet, the result can be displayed because D4≦(t80–t40), and the fourth packet is displayed for a time C4.

In conventional decoding processing, if decoding cannot be completed owing to high-speed search, discontinuity is generated between frames, and visual flaws occur in the time axis direction. A decoding apparatus of the first embodiment for solving this problem will be described below.

FIG. 1 is a block diagram showing the schematic arrangement of the decoding apparatus in the first embodiment. Reference numeral 101 denotes a DEMUX unit; 102a and 102b, decoding buffers; 103a and 103b, decoding units; 104a and 104b, memories; 105a and 105b, output units; and 106a and 106b, sync controllers. The units 102a to 106a (to be referred to as decoder 1) and the units 102b to 106b (to be referred to as decoder 2) have the same arrangement, which means that a plurality of decoding processes are performed parallel. Generally, video decoding and audio decoding correspond to these decoding processes. One of the features of the first embodiment is that decoders 1 and 2 adopt the sync controllers. Decoder 1 will be explained mainly for the sync controller. Note that it is easily understood that the following description also applies to decoder 2.

Figure 2:
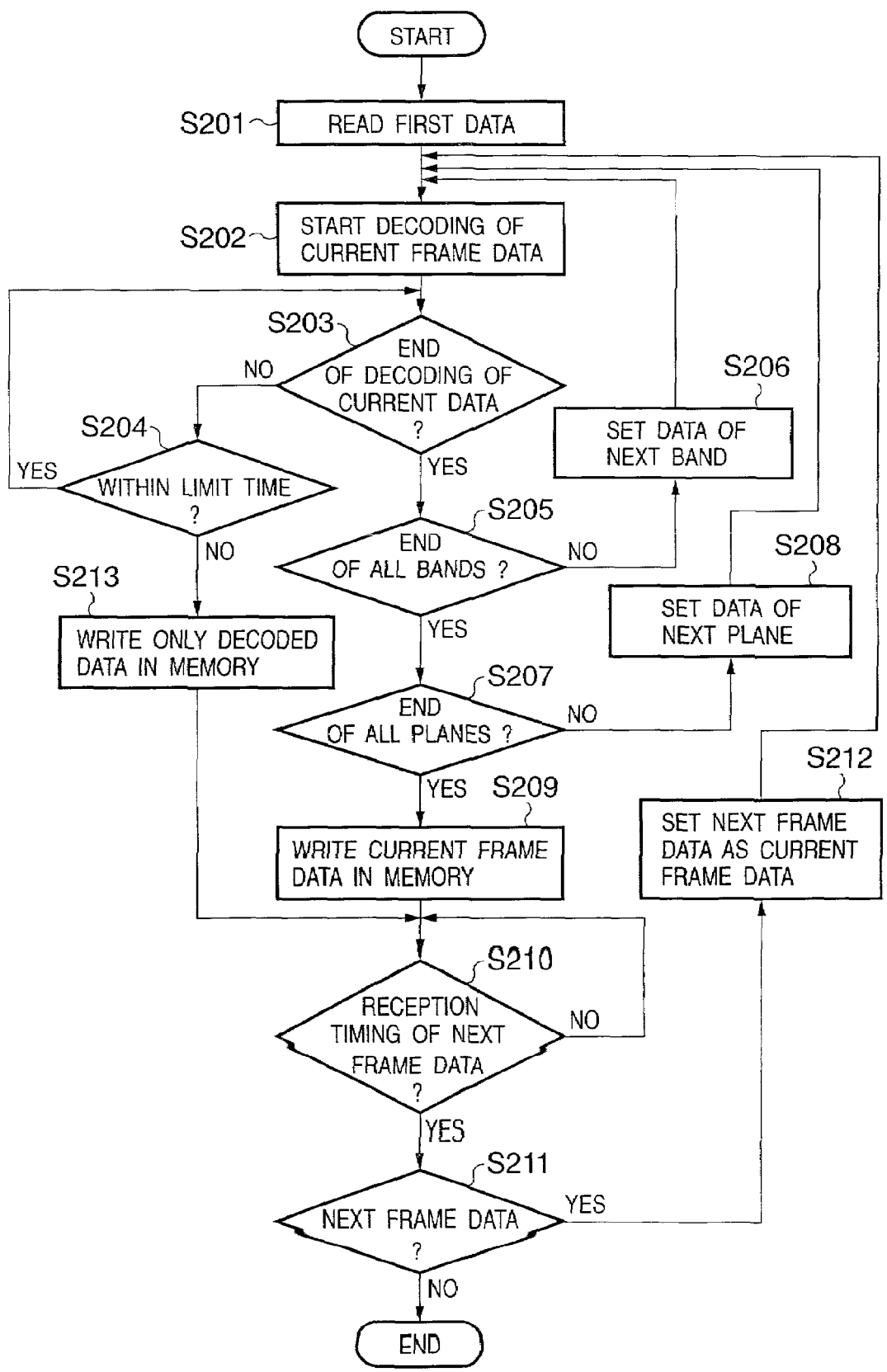
FIG. 2 is a flow chart showing decoding processing of the decoding apparatus in the first embodiment of the present invention.

The sync controller 106a detects the times at which the header of an access unit should be read and decoding 1 should end processing. If decoder 1 cannot complete processing within a necessary processing time, the following control is done for the decoding buffer 102a and decoding unit 103a. The timing of control and its processing contents will be described with reference to FIG. 2 showing the flow chart of this processing. In this case, the access unit is a frame.

The first data is read in step S201, and decoding of the frame data starts in step S202. This processing means a state wherein the decoding unit 103a reads out data from the decoding buffer 102a on demand and decodes them in FIG. 1. Until decoding processing ends at the branch in step S203, whether the current time exceeds the processing limit time assigned to this packet is monitored in step S204. For convenience, the time till the reception timing of the next frame may be assumed as an assigned maximum decoding processing time. Within the assigned processing limit time, the current data is kept decoded. If a bit stream is SNR scalable, respective subband data are arranged from the low-frequency side to the high-frequency side for each bit plane. An example is bit planes included in the code stream shown in FIG. 16A. If the number of bits assigned to each subband changes, the number of subbands on the MSB side is smaller than that on the LSB side. In this example, the number of subbands on the MSB side is three, LL, HL2, and LH2. The first current data in FIG. 2 is an LL band of a bit plane (S-1).

After step S205, data of the next subband, i.e., HL2 is set as new data to be processed in step S206. The flow passes through this loop again to process LH2, and decoding of all the data included in the bit plane (S-1) ends. After step S207, the flow shifts to processing of a bit plane BitsS-2 in step S208. The flow repeats this loop to end decoding up to a bit plane 0 and end decoding of all the data of this frame.

In step S209, the current frame data is written in the memory. The display timing complies with another information in the packet header. At the reception timing of the next frame data in step S210, whether the next frame data exists is checked in step S211. If YES in step S211, the next frame data is set as current frame data in step S212, and the flow returns to processing of step S202; if NO in step S211, a series of processes end. If it is determined in step S204 that processing did not end within the limit time, only decoded data are written in the memory in step S213. The display timing complies with time management information in the packet header. Since decoding processing ends within the limit time, the display time defined in the header coincides with the actual data display time. This relationship will be explained with reference to FIGS. 3A to 3C.

Figure 3A:
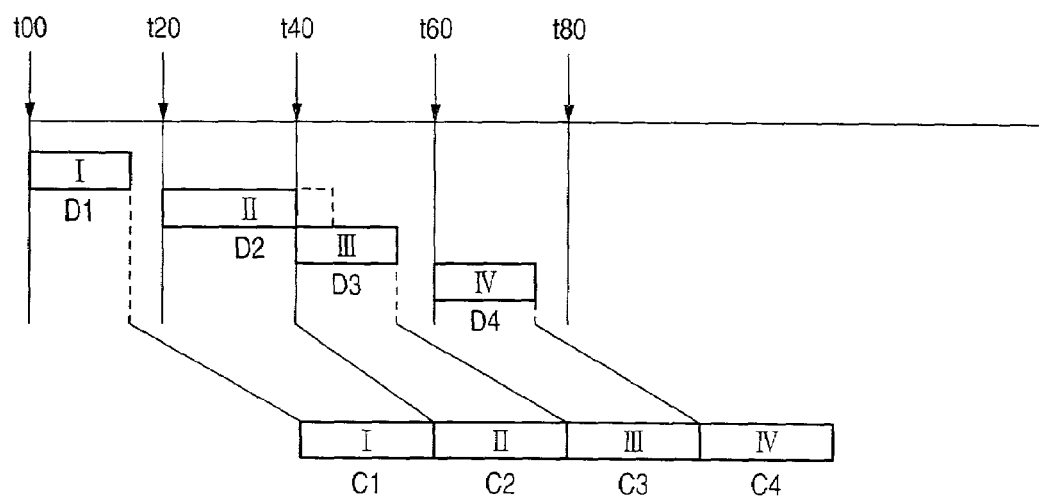
FIG. 3A is a view showing decoding processing in 2×-speed playback according to the first embodiment of the present invention.
Figure 3B:
FIG. 3B is a view showing an example of an image displayed in normal playback according to the first embodiment of the present invention.
Figure 3C:
FIG. 3C is a view showing an example of an image displayed in 2×-speed playback according to the first embodiment of the present invention.
Figure 18B:
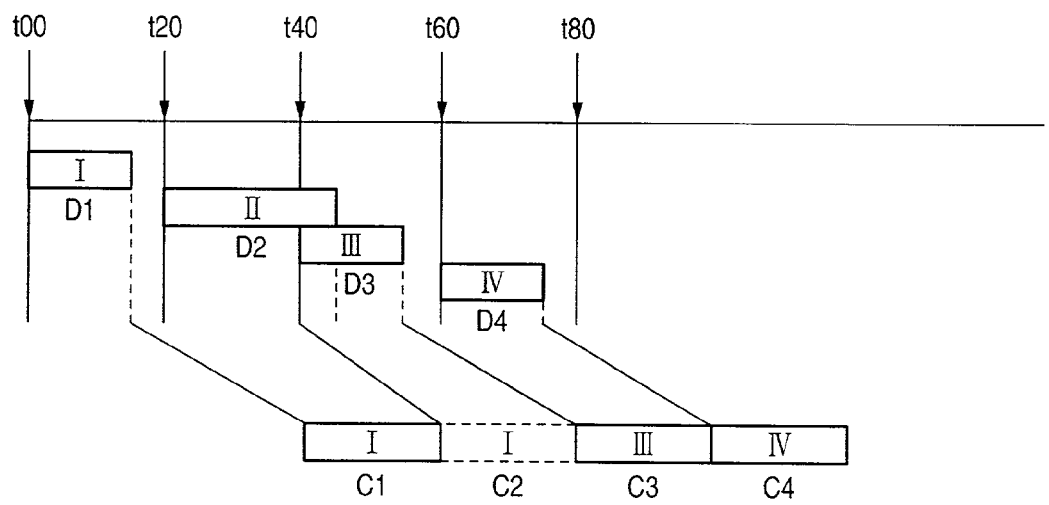
FIG. 18B is a view for explaining conventional processing from reception to display of a packet in 2×-speed playback.

FIG. 3A shows 2×-speed playback, similar to FIG. 18B. The first packet received at timing t=t00 takes a time D1 for decoding processing and is displayed for a time C1. The second packet received at timing t=t20 takes a time D2 for decoding processing, but all the data cannot be decoded within this time because D2>(t40–t20). FIG. 4A shows an entire encoded stream which should be originally decoded, and FIG. 4B shows data decoded partway owing to a short processing time. In this example, the final bit plane Bit0, and HL1, LH1 and HH1 of the bit plane Bit1 are not decoded. Hence, the image of this frame is slightly lower in image quality than other frames. FIG. 3C is a view for explaining the image quality in 2×-speed playback. The image quality of the second frame is slightly lower than the image quality in normal playback in FIG. 3B. However, the number of frames to be played back does not decrease, so that a smooth motion can be reproduced similarly to normal playback in FIG. 3B. In this manner, if the processing time is short, only decoded data are written in the memory to guarantee the image quality of at least the decoded data.

Figure 6A:
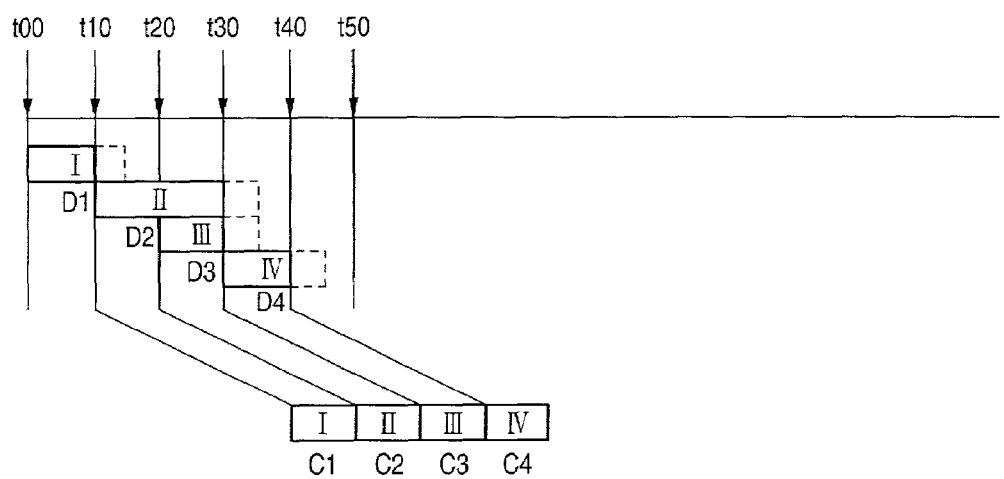
FIG. 6A is a view showing decoding processing in 4×-speed playback according to the second embodiment of the present invention.
Figure 6B:
FIG. 6B is a view showing an example of an image displayed in 4×-speed playback according to the second embodiment of the present invention.

FIG. 6A shows 4×-speed playback. As for the first packet received at timing t=t00, all the data cannot be decoded within the time D1, and only data which can be decoded till the next packet reception timing t=t10 are displayed for the time C1. This also applies to D2, D3, and D4. In this example, as all the four packets cannot be decoded within their processing times, the images of the frames are displayed at a low image quality. However, the number of frames to be played back does not decrease even at a 4× speed, so that a smooth motion can be reproduced.

As described above, image continuity can be maintained by the above processing for each packet though the image quality slightly changes between frames.

Second Embodiment

In the second embodiment, even a frame whose processing time cannot fall within a predetermined time maintains image quality at a predetermined or higher level. A decoding apparatus in the second embodiment has the same arrangement as that in FIG. 1.

Figure 5:
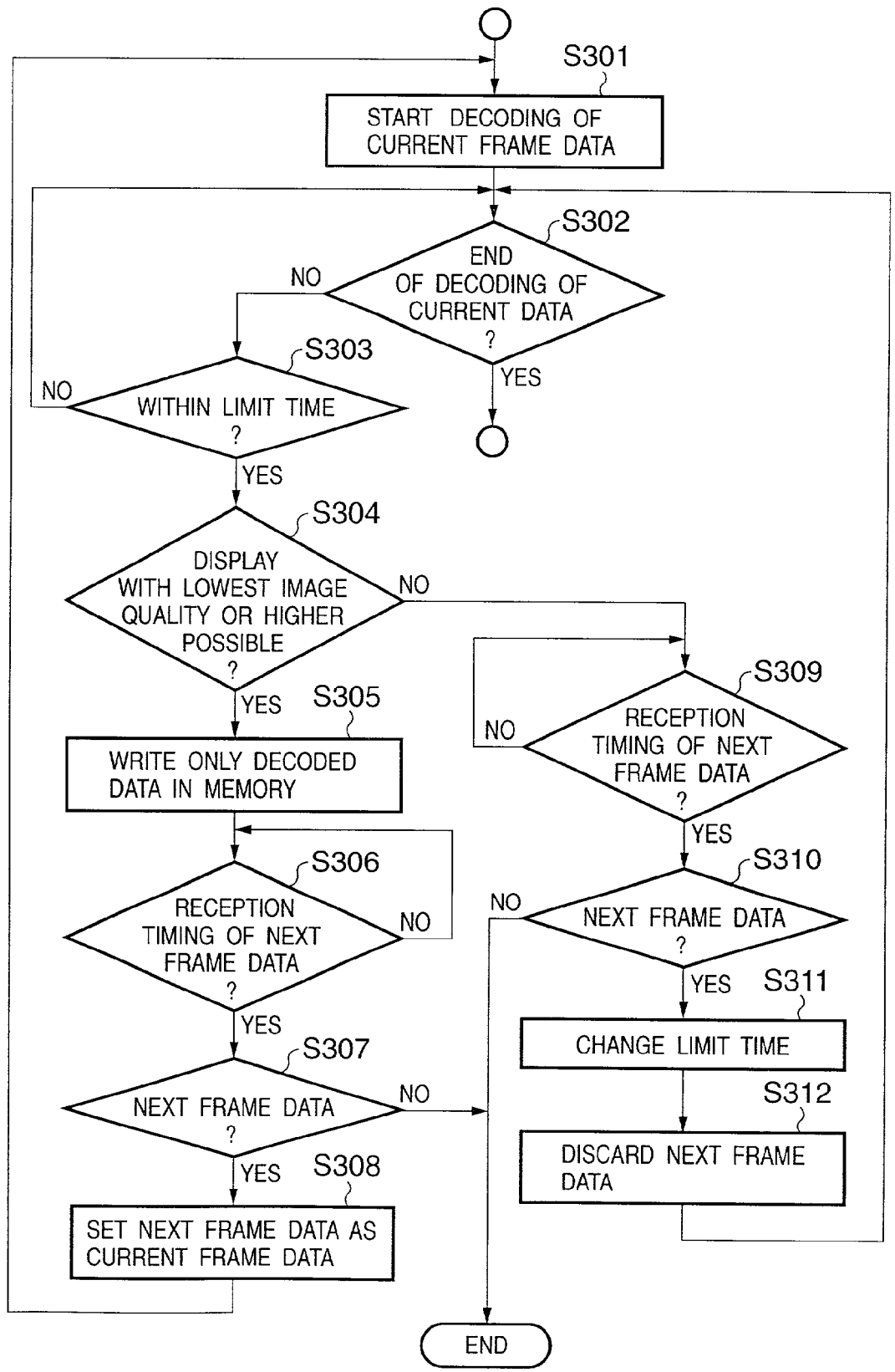
FIG. 5 is a flow chart showing decoding processing of a decoding apparatus in the second embodiment of the present invention.

The flow chart of decoding processing of the decoding apparatus in the second embodiment will be described with reference to FIG. 5. Note that a description of the same processing as in the flow chart shown in FIG. 2 will be omitted. Assuming that processing of step S201 has already ended in processing of step S301, processing of step S201 is not shown in FIG. 5.

If the end of decoding of the current data is determined in step S302, the same processing as processing from steps S205 to S211 is executed. Whether the processing time has reached the limit time is checked in step S303. If YES in step S303, whether the image quality of the decoded data is higher than the lowest image quality set in advance is determined in step S304. The image quality is set in advance such that all data must be decoded up to the bit plane (S-1) or data must be decoded up to the most significant bit plane of all the subbands. The lowest image quality is preferably set in accordance with the processing performance of the decoding unit, which will be described later. If YES in step S304, the flow advances to step S305, and the decoding result is written in a memory 104a.

Similar to FIG. 2, the flow waits for the reception timing of the next frame data in step S306. If the next frame data exists in step S307, the next frame data is set as current frame data in step S308, and decoding processing continues. If NO in step S307, the current frame data is determined as a final frame, and a series of processes end.

If NO in step S304, the flow waits for the reception timing of the next frame data in step S309. If the next frame data exists in step S310, the limit time is changed in step S311. The limit time is changed by newly adding time management information within the packet header. That is, the current frame is processed within the total time of the processing time of the current frame and the processing time of the next frame. In step S312, the next frame data is discarded, and data in a decoding buffer 102a is held.

Figure 19A:
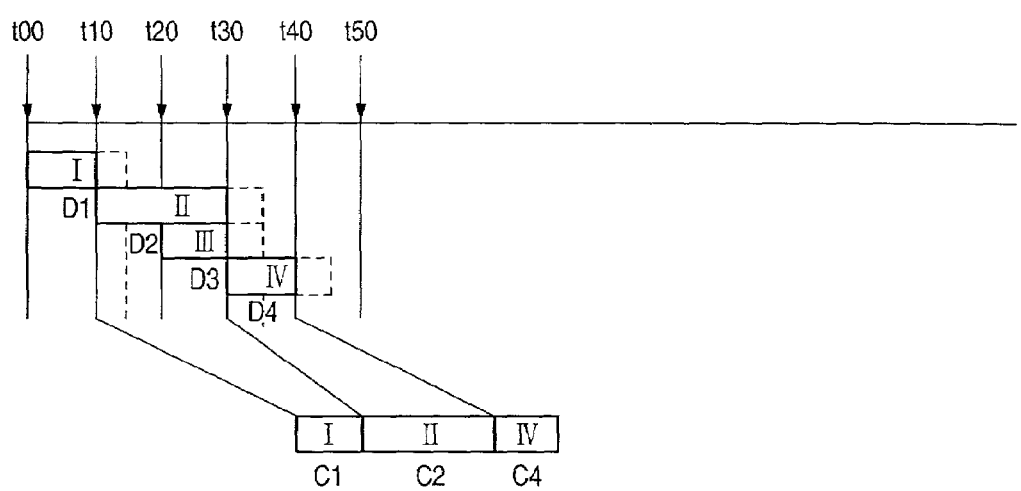
FIG. 19A is a view for explaining decoding processing in the second embodiment of the present invention.
Figure 19B:
FIG. 19B is a view showing an example of an image displayed according to the second embodiment of the present invention.

This relationship will be explained by exemplifying 4×-speed playback in FIG. 19A. FIG. 19B shows a display example of an image in this case. In decoding processing of the first frame in FIG. 19A, all encoded data cannot be decoded, but the image quality is higher than the lowest image quality, and the first frame image is displayed for the time C1. In decoding processing of the second frame, data cannot be decoded even with the lowest image quality within the limit time D2, so that the decoding time of the second frame is assigned up to the decoding limit time t of the third frame=t30. The display time C2 of the second frame image corresponds to two frames. Hence, the third frame image is not displayed, but the image quality of the second frame image is held.

Figure 22:
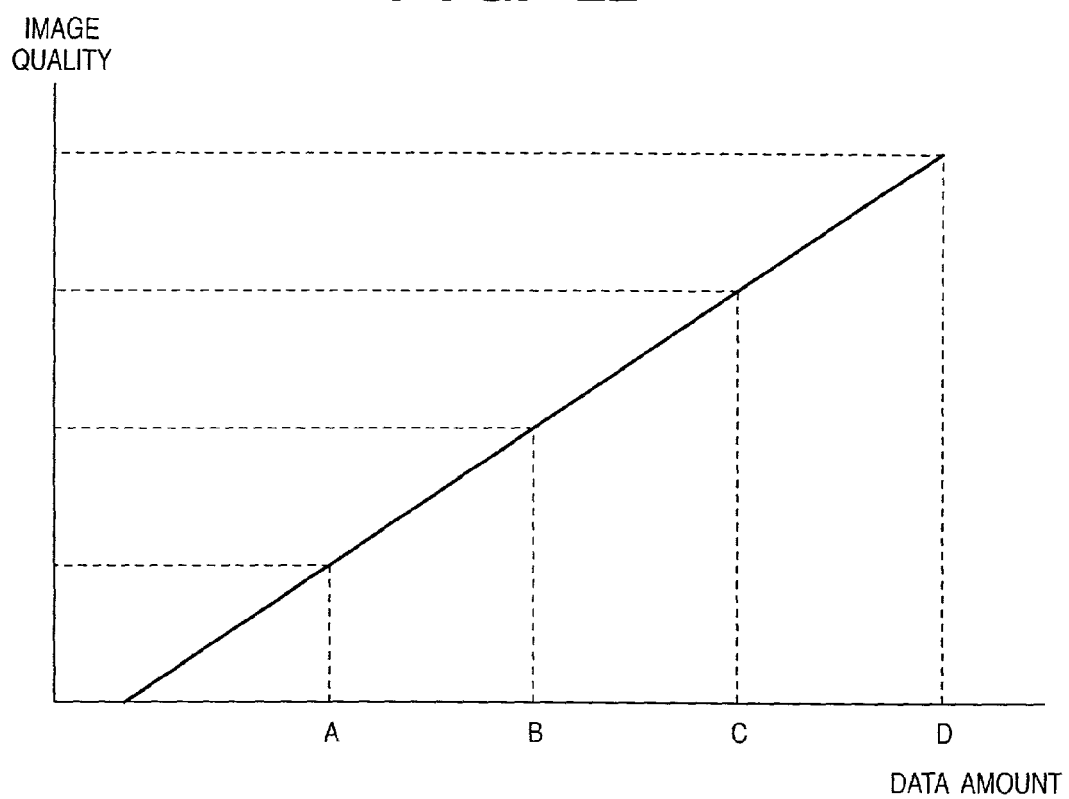
FIG. 22 is a graph for explaining the relationship between the image quality and the data amount.
Figure 31:
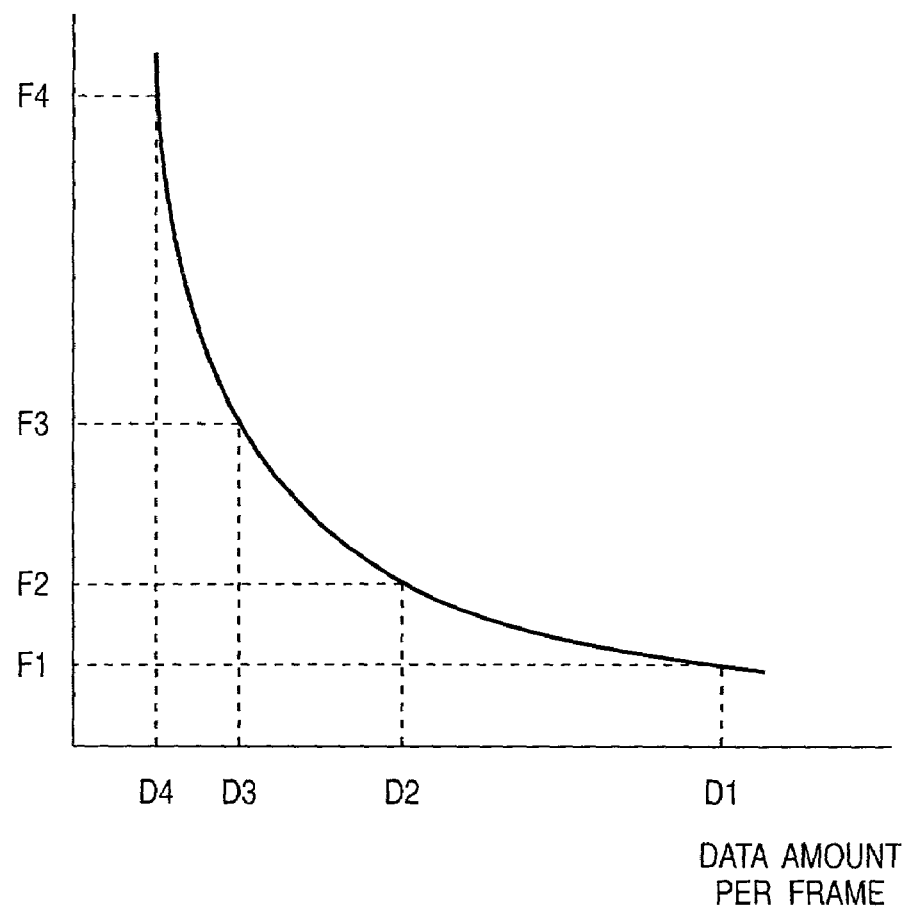
FIG. 31 is a view for explaining the relationship between the frame rate and the data amount.

When the lowest image quality is not guaranteed, the frame frequency (the number of frames displayed per second), i.e., the display frame rate increases as the speed of high-speed playback increases. In some cases, the image quality is preferably improved even by decimating or downsampling frames in terms of the processing performance of the decoding unit, the display performance of the display, and visual effects. FIG. 31 is a graph showing an example of the relationship between the data amount per frame and the display frame rate. To increase the display frame rate, the data amount per frame must be decreased. To increase the data amount per frame, the display frame rate must be decreased. The data amount and image quality have a relationship as shown in FIG. 22. In this case, decreasing the data amount per frame degrades the image quality. The lowest image quality is set by balancing the smoothness of the frame motion and the image quality of each frame. As a simple implementation means, the relationship between the playback speed of high-speed playback and the lowest image quality is held as a table. FIG. 32 shows an example of the table. This example assumes data of 8-bit precision. All the bits are guaranteed up to a 2× speed, upper six bits are guaranteed up to a 4× speed, and upper four bits are guaranteed up to a 6× speed. For a speed higher than the 6× speed, an image quality of upper three bits is guaranteed.

As described above, the decoding apparatus of the second embodiment always manages the image quality of a frame to be decoded and always generates an image with a predetermined or higher image quality.

Third Embodiment

Figure 20:
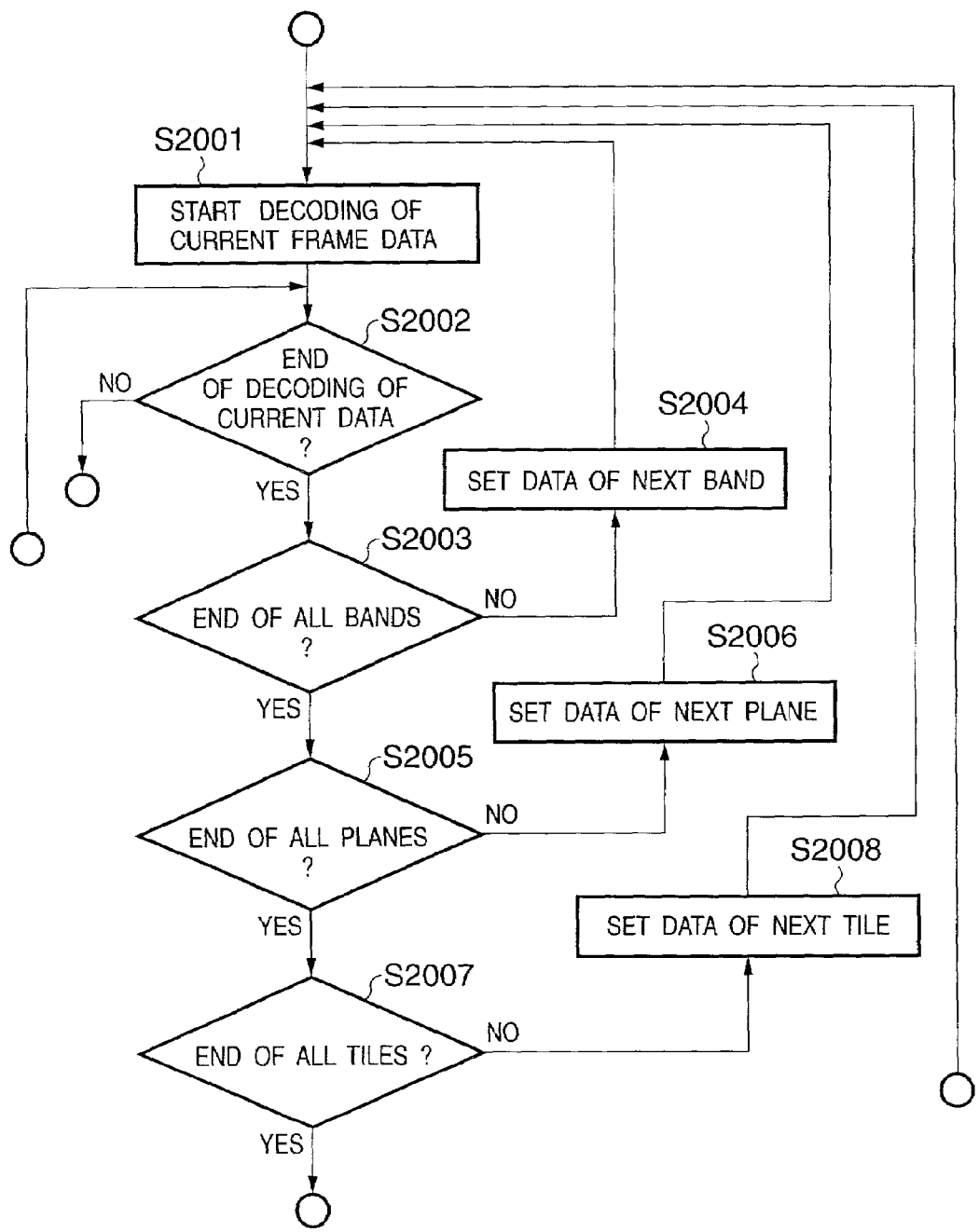
FIG. 20 is a flow chart showing decoding processing of a decoding processing in the third embodiment of the present invention.

A decoding apparatus in the third embodiment has the same arrangement as that in FIG. 1, but has different processing control contents. Details of the processing will be described with reference to the flow chart of decoding processing in the third embodiment shown in FIG. 20. A description of the same processing as that in the flow chart shown in FIG. 2 will be omitted. In the case, the processing unit is not a frame but a tile. The tile is obtained by breaking up a frame into a plurality of regions, and processing for each region is repeated by the number of tiles.

The first plane of the first tile in the current frame is processed for each band (loop of steps S2003→S2004). After processing of all the bands ends, processing is repeated for the next plane (loop of steps S2005→S2006). After processing of all the planes ends, processing is repeated for the next tile (loop of steps S2007→S2008). This processing is repeated for all the tiles in the frame.

If the lowest image quality in high-speed playback is set in processing in units of tiles, a region where the image is updated may be localized owing to the difference in data amount between tiles on the screen. This is prevented by setting the next tile data at random in step S2008, which will be explained with reference to FIGS. 21A to 21J.

FIG. 21A shows an example of dividing one frame into nine tiles. FIGS. 21B to 21J show shuffling examples of nine patterns using these tiles. The decoding priority is T1→T2→. . . →T9. In shuffling, the priority is sequentially changed at the same position of each tile on the screen. When decoding processing cannot be completed and data T9 fails to be decoded, data below the center in FIG. 21B, upper right data in FIG. 21C, and data left to the center in FIG. 21D cannot be decoded. Accordingly, successive failure in decoding data at the same position can be prevented.

When only a tile T1 can be processed by the decoder within a given time, the display is updated at a position above the center in FIG. 21B, a position below the center in FIG. 21C, and an upper right position in FIG. 21D. In this way, data is updated at different positions for respective frames, and data goes the round by nine frames. Shuffling is implemented by reading the header of each packet and setting the decoding start position of the decoding unit in the decoding buffer. At this time, the read position of bit stream data and the write position of decoded data in the memory are made to coincide with each other.

As described above, decoding processing of the decoding apparatus according to the third embodiment can prevent the image at the same position from failing in decoding successively because the tile position not decoded changes in playing back a decoded frame.

Fourth Embodiment

A decoding apparatus in the fourth embodiment has the same arrangement as that in FIG. 1, but has different processing control contents. The control timing and processing contents are shown in the flow chart of FIG. 23. In this embodiment, the access unit is a frame.

The first data is read in step S2301, and decoding of the frame data starts in step S2302. This processing means that a decoding unit 103a or 103b in FIG. 1 reads out data from a decoding buffer 102a or 102b on demand and decodes the data.

Until decoding processing ends at the branch in step S2303, whether the current time exceeds the processing limit time assigned to this packet is monitored in step S2304. For convenience, the time till the reception timing of the next frame may be assumed as an assigned maximum decoding processing time. Within the assigned processing limit time, the current data is kept decoded. If a bit stream is space-scalable, respective bit plane data are arranged from the upper-bit side to the lower-bit side for each subband. An example is subbands included in the code stream shown in FIG. 15A.

If the end of decoding of the current data is determined in step S2303, the flow advances to step S2305, and whether all the planes have been processed is checked. After step S2305, the next plane data, i.e., BitS-2 is set as new data to be processed in step S2306. After this loop is done for all the planes, processing for the first subband LL ends. After step S2307 of determining whether all the bands have been processed, processing shifts to the next subband HL2 in step S2308. After the above loop is repeated and decoding proceeds up to the final subband HH1, all the data of the frame have been decoded.

In step S2309, the current frame data is written in the memory. The display timing complies with another information in the packet header. At the reception timing of the next frame data in step S2310, the flow advances to step S2311, and whether the next frame data exists is checked in step S2311. If Yes in step S2311, the next frame data is set as current frame data in step S2312, and the flow returns to processing of step S2302; if No in step S2311, a series of processes end.

If it is determined in step S2304 that processing did not end within the limit time, the flow shifts to step S2313, and only decoded data are written in the memory. The display timing complies with time management information in the packet header. Since decoding processing ends within the limit time, the display time defined in the header coincides with the actual data display time. This relationship will be explained with reference to FIGS. 24A to 24D.

Figure 25A:
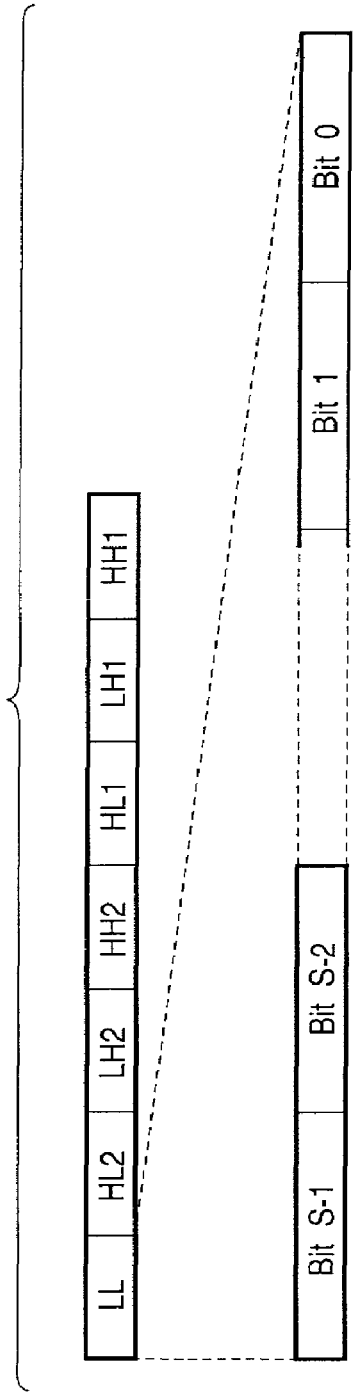
FIG. 25A is a view showing an entire encoded stream which should be originally decoded in the fourth embodiment of the present invention.

FIG. 25A shows 2×-speed playback, similar to FIG. 18B. The first packet received at timing t=t00 takes the time D1 for decoding processing and is displayed for the time C1. The second packet received at timing t=t20 takes the time D2 for decoding processing, but all the data cannot be decoded within this time because D2>(t40–t20).

Figure 25B:
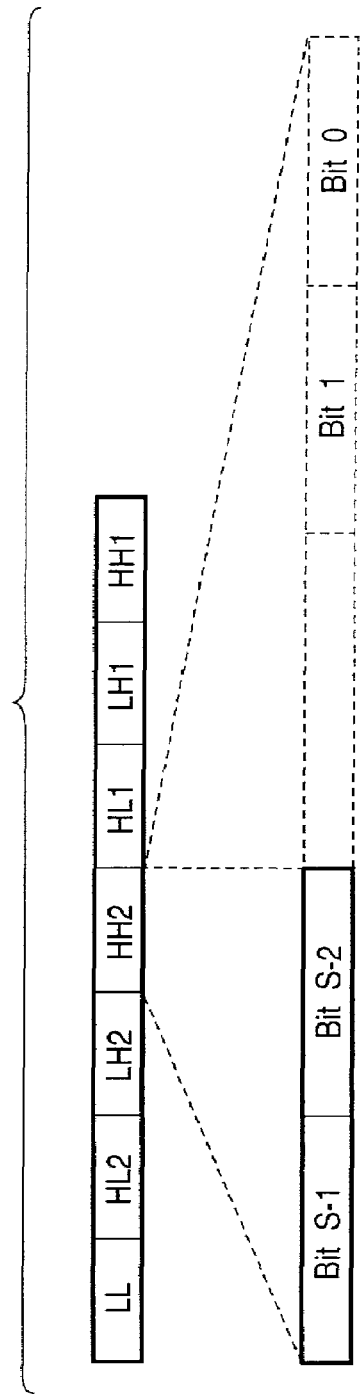
FIG. 25B is a view showing data decoded partway owing to a short processing time in the fourth embodiment of the present invention.

FIG. 25A shows an entire encoded stream which should be originally decoded, and FIG. 25B shows data decoded partway owing to a short processing time. In this example, data can only be decoded up to the intermediate bit plane BitS-2 in the intermediate subband HH2. Therefore, the image of this frame becomes smaller in image size than other frames.

Figure 24A:
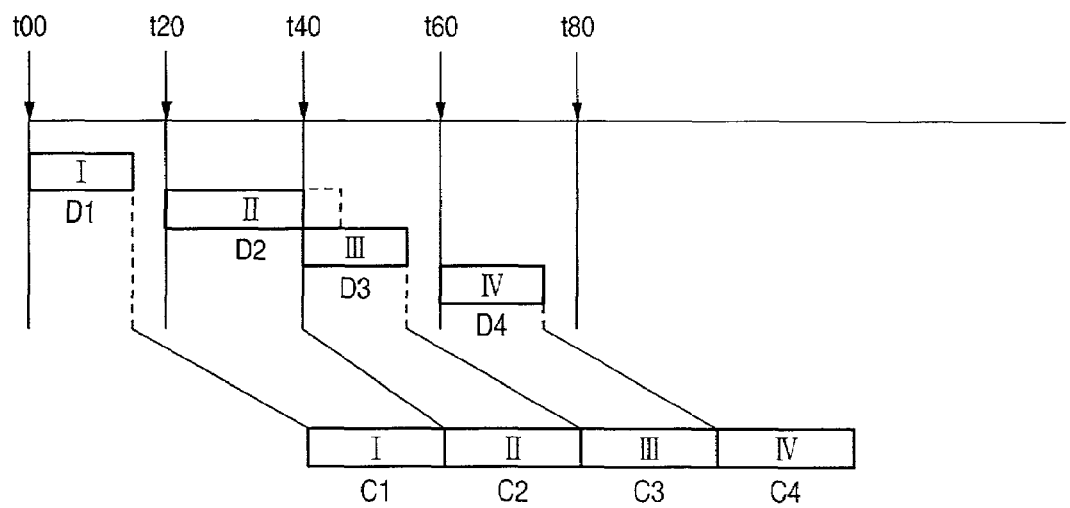
FIG. 24A is a view for explaining decoding processing by 2×-speed playback in the fourth embodiment of the present invention.
Figure 24B:
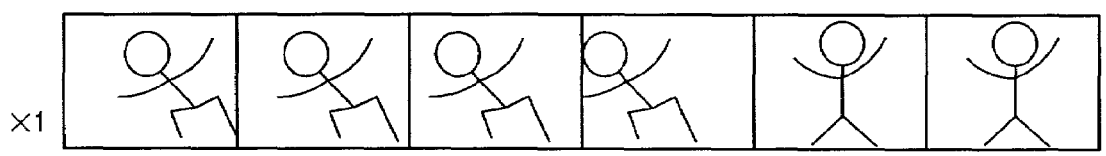
FIG. 24B is a view showing an example of an image displayed in normal playback according to the fourth embodiment of the present invention.
Figure 24C:
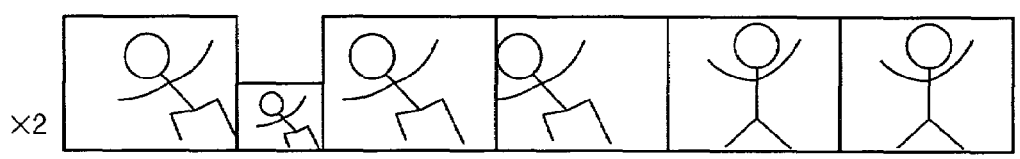
FIGS. 24C and 24D are views showing examples of an image displayed in 2×-speed playback according to the fourth embodiment of the present invention.
Figure 24D:
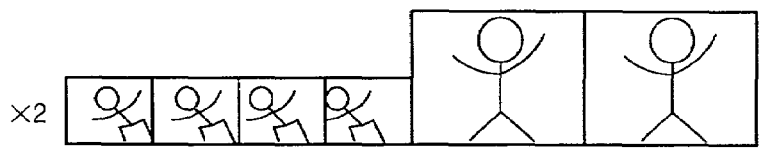

FIG. 24C is a view for explaining the image size in 2×-speed playback. The image size of the second frame is smaller than an image size in normal playback in FIG. 24B. In practice, the image size rarely sequentially changes within one scene. The image has a small image size in a scene having a large code amount, like FIG. 24D, and a standard image size in a scene having a small code amount. Even if the image size changes, the number of frames to be played back does not decrease, and a smooth motion can be reproduced similarly to normal playback in FIG. 24B. In this manner, if the processing time is short, only decoded data are written in the memory to guarantee the image quality of at least the decoded data without decimating frames.

Figure 27A:
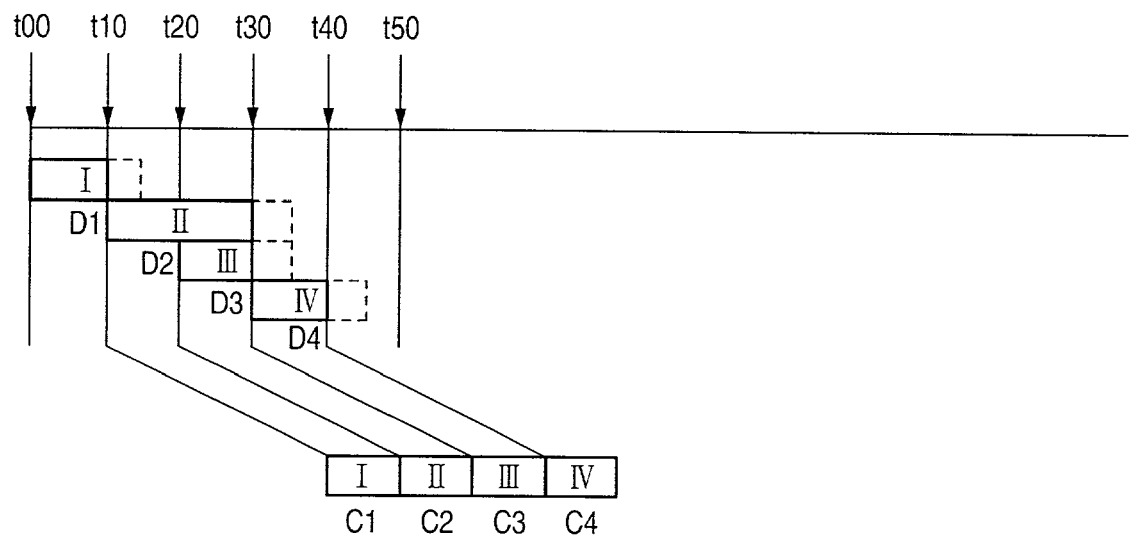
FIG. 27A is a view for explaining decoding processing by 4×-speed playback in the fourth embodiment of the present invention.
Figure 27B:
FIG. 27B is a view showing an example of an image displayed in 4×-speed playback according to the fourth embodiment of the present invention.

FIG. 27A shows 4×-speed playback. As for the first packet received at timing t=t00, all the data cannot be decoded within the time D1, and only data which can be decoded till the next packet reception timing t=t10 are displayed for the time C1. This also applies to D2, D3, and D4. In this example, since all the four packets cannot be decoded within their processing times, the images of the frames are displayed with a small size, as shown in FIG. 27B. However, the number of frames to be played back does not decrease even at a 4×speed, so a smooth motion can be reproduced.

As described above, image continuity can be maintained by the above processing for each packet though the size changes between frames.

Fifth Embodiment

The fourth embodiment changes the image size and maintains the number of frames to be played back. The fifth embodiment limits the image size to be changed and can guarantee a predetermined image size.

Figure 26:
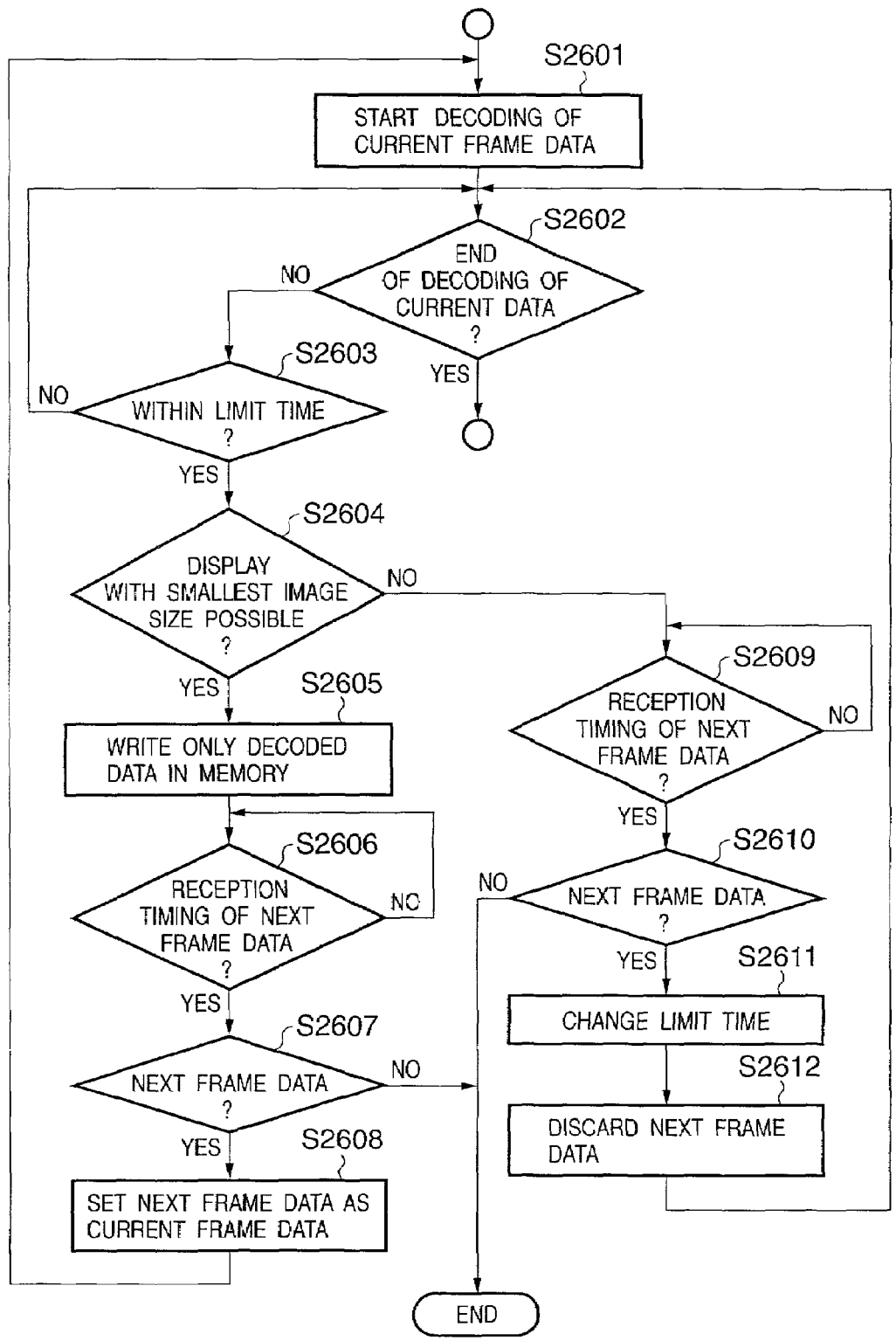
FIG. 26 is a flow chart showing decoding processing of a decoding apparatus in the fifth embodiment of the present invention.

A decoding apparatus in the fifth embodiment has the same arrangement as that in FIG. 1. Decoding processing in the fifth embodiment will be explained with reference to the flow chart of decoding processing of the decoding apparatus in the fifth embodiment shown in FIG. 26. Note that a description of the same processing as in the flow chart shown in FIG. 23 will be omitted. Assuming that processing of step S2301 has already ended in processing of step S2601, processing of step S2601 is not shown in FIG. 26. If the end of decoding of the current data is determined in step S2602, the same processing as processing from steps S2305 to S2311 is executed.

Whether the processing time has reached the limit time is checked in step S2603. If Yes in step S2603, whether the image size of decoded data is larger than the smallest image size set in advance is determined in step S2604. The smallest image size is set in advance such that all data must be decoded up to the subband LL or data must be decoded up to a size of LL +HL2 +LH2 +HH2. The set smallest image size is preferably set in accordance with the processing performance of the decoding unit, which will be described later. If Yes in step S2604, the flow advances to step S2605, and the decoding result is written in a memory 104a.

Figure 23:
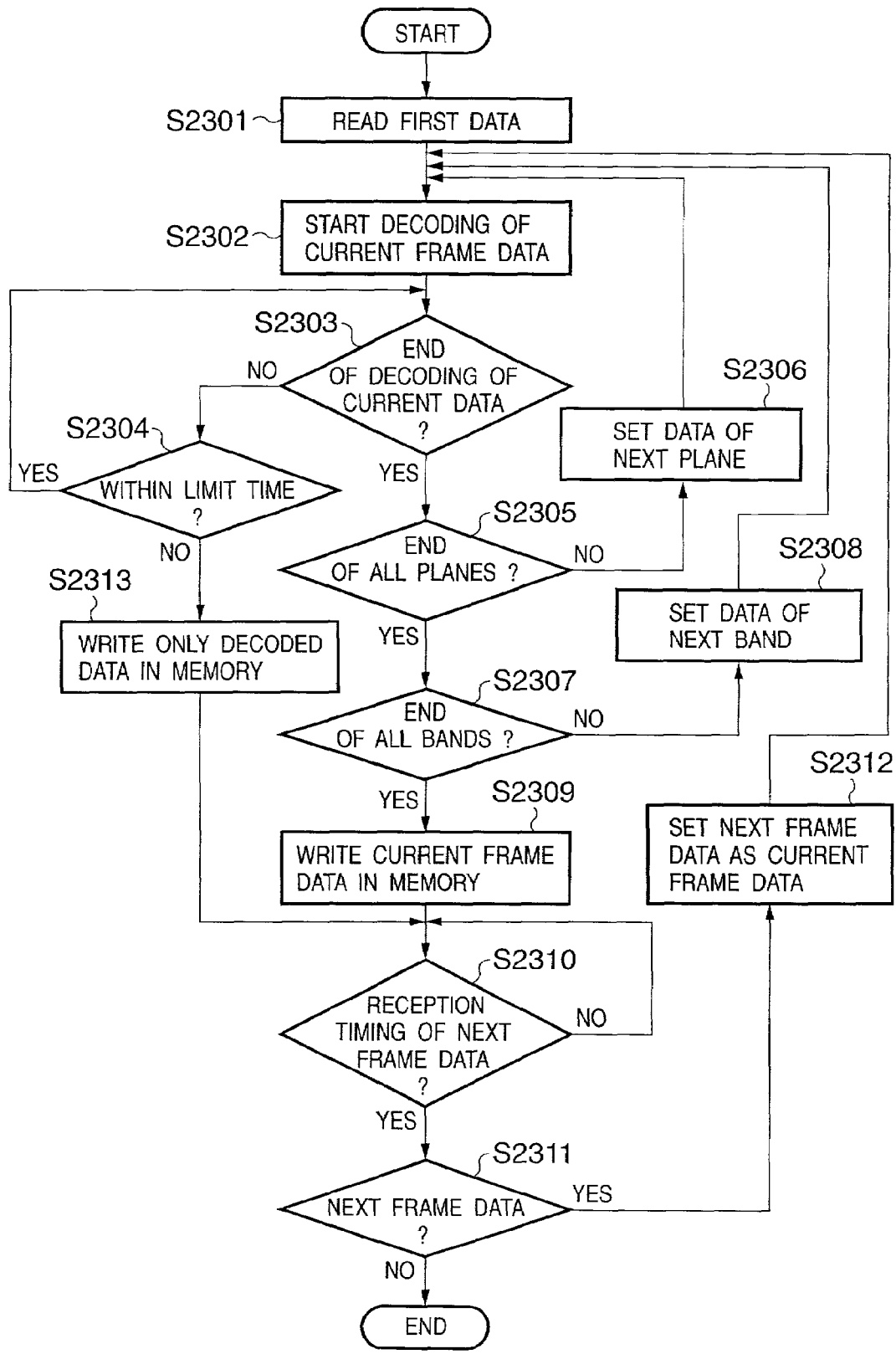
FIG. 23 is a flow chart showing decoding processing of a decoding apparatus in the fourth embodiment of the present invention.

The following processing is the same as processing in step S2310 and subsequent steps in FIG. 23. That is, the flow waits for the reception timing of the next frame data in step S2606. If the next frame data exists in step S2607, the next frame data is set as current frame data in step S2608, and decoding processing continues. If No in step S2607, the current frame data is determined as a final frame, and a series of processes end.

If No in step S2604, the flow advances to step S2609 and waits for the reception timing of the next frame data. In step S2610, whether the next frame data exists is checked. If Yes in step S2610, the flow shifts to step S2611, and the limit time is changed. The limit time is changed by newly adding time management information within the packet header. That is, the current frame is processed within the total time of the processing time of the current frame and the processing time of the next frame. In step S2612, the next frame data is discarded, and data in a decoding buffer 102a is held.

Figure 28A:
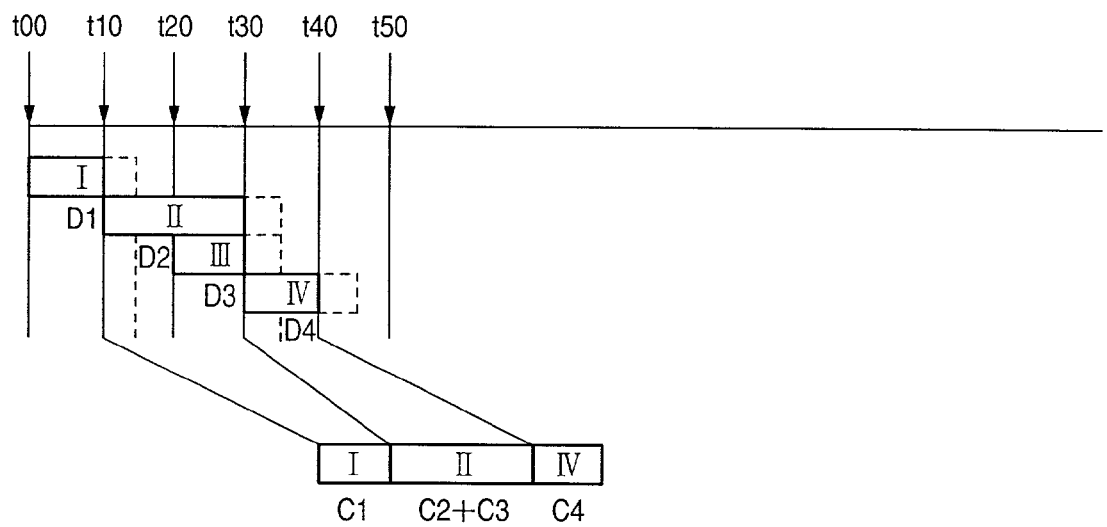
FIG. 28A is a view for explaining decoding processing by 4×-speed playback in the fifth embodiment of the present invention.
Figure 28B:
FIG. 28B is a view showing an example of an image displayed in 4×-speed playback according to the fifth embodiment of the present invention.

This relationship will be explained by exemplifying 4x-speed playback in FIGS. 28A and 28B. In decoding processing of the first frame in FIG. 28A, all encoded data cannot be decoded, but the image size is larger than the smallest image size, and the first frame image is displayed for the time C1. In decoding processing of the second frame, data cannot be decoded even with the smallest image size within the limit time D2, so the decoding time of the second frame is assigned up to the decoding limit time t of the third frame=t30. The display time is also prolonged to C2+C3, which corresponds to two frames. In other words, the third frame image is not displayed, but the image size of the second frame image is held.

Figure 30:
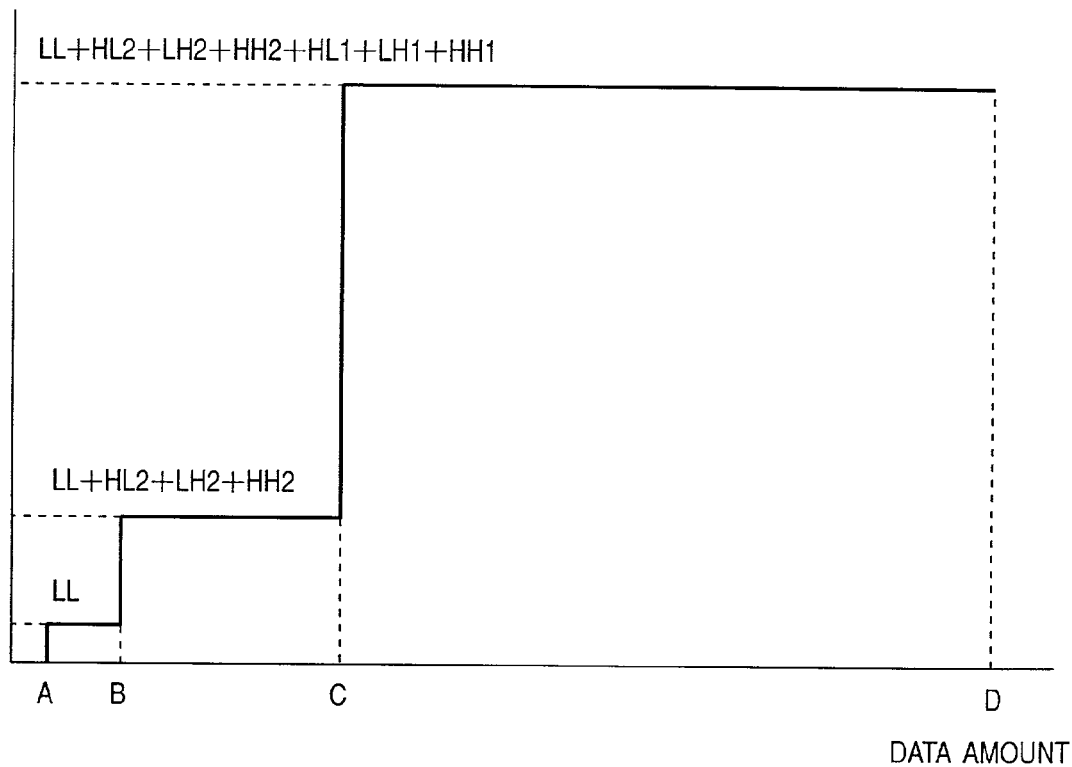
FIG. 30 is a graph for explaining the relationship between the image size and the data amount.

When the smallest image size is not guaranteed, the frame frequency (the number of frames displayed per second) increases as the speed of high-speed playback increases. In some cases, the image size is preferably maintained even by decimating frames in terms of the processing performance of the decoding unit, the display performance of the display, and visual effects. The data amount per frame and display frame rate have the relationship shown in FIG. 31. To increase the display frame rate, the data amount per frame must be decreased. To increase the data amount per frame, the display frame rate must be decreased. The data amount and image quality have a relationship as shown in FIG. 30. In this case, decreasing the data amount per frame decreases the image size. The smallest image size is set by balancing the smoothness of the frame motion and the image size of each frame. As a simple implementation means, the relationship between the playback speed of high-speed playback and the smallest image size is held as a table. FIG. 33 shows an example of the table. In this example, the full image size is guaranteed up to a 3x speed, and a ¼ image size is guaranteed up to a 6x speed. For a speed higher than the 6x speed, a ⅛ image size is guaranteed.

As described above, the decoding apparatus of the fifth embodiment always manages the smallest image size of a frame to be decoded and always generates an image with a predetermined or higher image size.

Sixth Embodiment

The third embodiment prevents the image at the same tile position from successively failing in decoding. The sixth embodiment gives high priority to tiles around the center of the screen so as to obtain an image with a stable size around the center of the screen.

Figure 29:
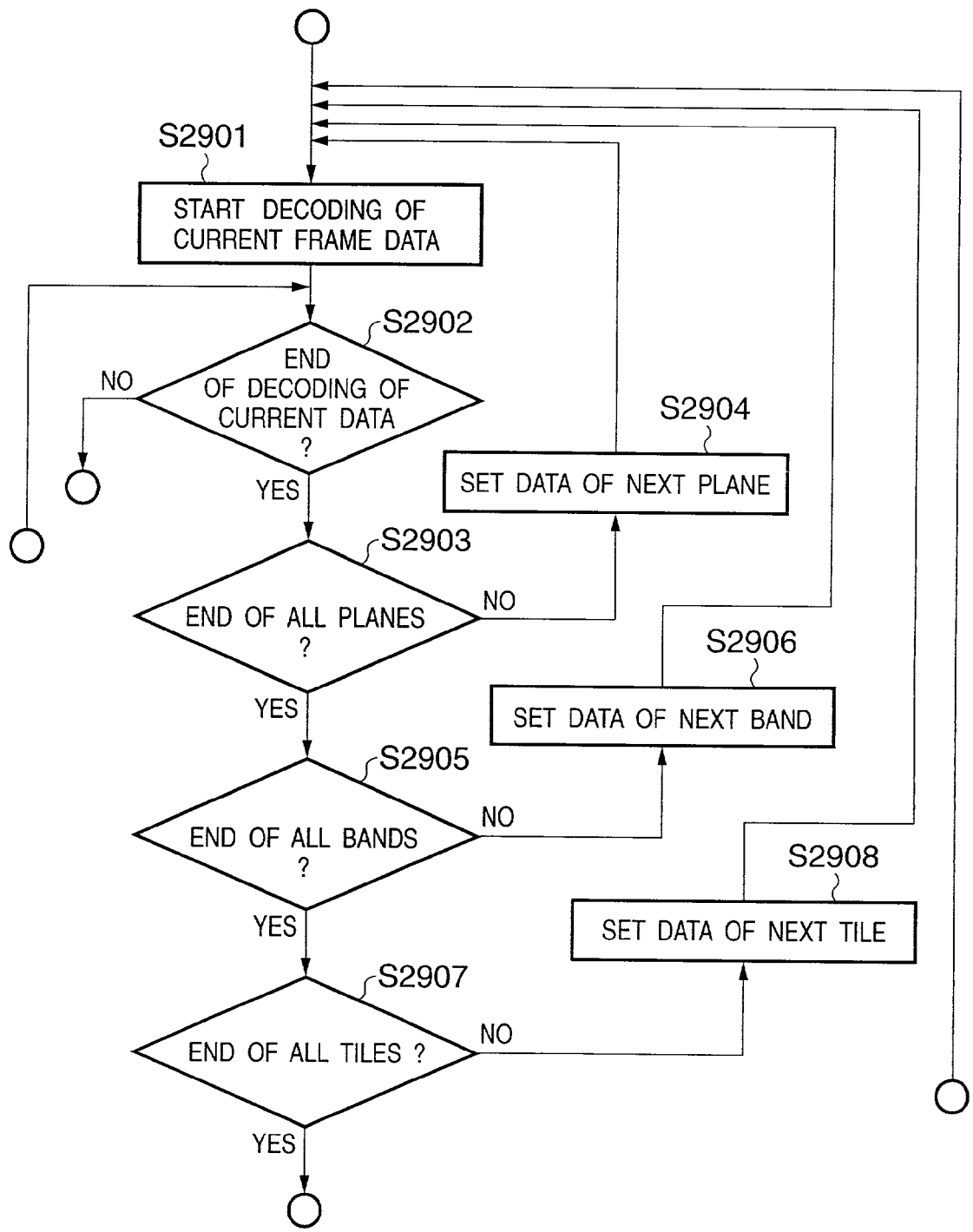
FIG. 29 is a flow chart showing decoding processing of a decoding apparatus in the sixth embodiment of the present invention.

A decoding apparatus in the sixth embodiment has the same arrangement as that in FIG. 1. Decoding processing in the sixth embodiment will be explained with reference to the flow chart of FIG. 29. A description of the same processing as that in the flow chart shown in FIG. 2 will be omitted. In the case, the processing unit is not a frame but a tile.

The first band of the first tile in the current frame is processed for each plane (loop of steps S2903→S2904). After processing of all the planes ends, processing is repeated for the next band (loop of steps S2905→S2906). After processing of all the bands ends, processing is repeated for the next tile (loop of steps S2907→S2908). This processing is repeated for all the tiles in the frame.

In processing in units of tiles, the image size of the tile may be localized owing to the difference in data amount between tiles on the screen in high-speed playback. This is prevented by giving priority to the playback position of a tile image and decoding tiles in descending order of priority. A tile near the center of the screen is given high priority, and a tile at the end of the screen is given low priority. Accordingly, a stable-size image can be attained near the center of the screen.

As described above, decoding processing of the decoding apparatus in the sixth embodiment enables decoding the image at the same position with a stable size by giving priority to the decoding tile position in playing back a decoded frame.

Other Embodiment

The following description concerns a case wherein the decoding apparatus shown in FIG. 1 according to the above embodiments is implemented by using a general-purpose personal computer.

Figure 34:
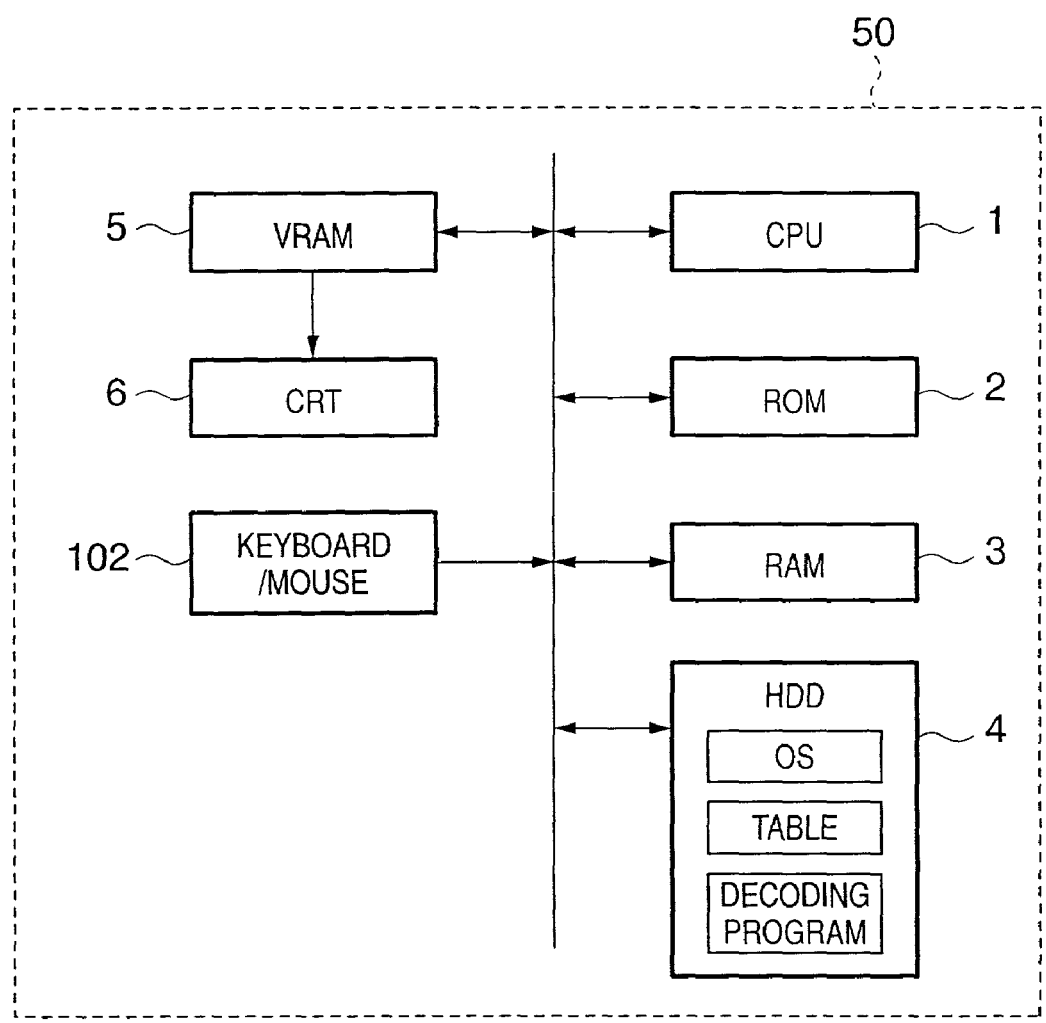
FIG. 34 is a block diagram showing an example of a personal computer functioning as a decoding apparatus of the present invention.

FIG. 34 is a block diagram showing the hardware arrangement of a personal computer 50 functioning as the decoding apparatus shown in FIG. 1. As shown in FIG. 34, the personal computer 50 comprises the following arrangement in addition to a CPU 1 for controlling the overall system, a ROM 2 which stores a boot program and the like, and a RAM 3 functioning as a main memory.

An HDD 4 is a hard disk device. A VRAM 5 is a memory where image data to be displayed is mapped. Image data or the like can be mapped in the VRAM 5 and displayed on a CRT 6. Reference numeral 7 denotes a keyboard and mouse for performing various settings.

As shown in FIG. 34, the HDD 4 stores an OS, the tables in FIGS. 32 and/or 33, and a decoding program corresponding to a flow chart shown in at least one of FIGS. 2, 5, 20, 23, 26, and 29. The decoding program also includes the functions of the DEMUX unit 101, decoding units 103a and 103b, and sync controllers 106a and 106b in FIG. 1.

The RAM 3 also functions as the decoding buffers 102a and 102b and the memories 104a and 104b. The function of the output units 105a and 105b is implemented by the VRAM 5 and CRT 6. Designation of the playback speed, setting of the lowest image quality in the second embodiment, and/or setting of the smallest image size in the fifth embodiment is input via the keyboard and mouse.

The OS and decoding program stored in the HDD 4 is loaded to the RAM 3 upon turning on the power supply, and executed by the CPU 1. The execution speed of decoding processing in this arrangement greatly depends on the processing performance of the CPU 1. It is, therefore, preferable to create a table (see FIG. 32) representing the relationship between the playback speed and the lowest image quality so as to set the lowest image quality in accordance with the processing performance of the CPU 1 in the second embodiment described above. Similarly, it is preferable to create a table (see FIG. 33) representing the relationship between the playback speed and the smallest image size so as to set the smallest image size in accordance with the processing performance of the CPU 1 in the fifth embodiment described above.

This arrangement allows the personal computer to function as the decoding apparatus according to the present invention and perform processing of the above-described embodiments.

The present invention may be applied to a system constituted by a plurality of devices (e.g., a host computer, interface device, reader, and printer) or an apparatus comprising a single device (e.g., a copying machine or facsimile apparatus).

The object of the present invention is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized not only when the computer executes the readout program codes, but also when the operating system (OS) running on the computer performs part or all of actual processing on the basis of the instructions of the program codes.

The functions of the above-described embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above-mentioned flow chart (shown in at least one of FIGS. 2, 5, 20, 23, 26, and 29).

As has been described above, the present invention can eliminate visual flaws between frames even if several frames cannot be decoded.

The present invention is not limited to the above embodiments and various changes and modifications can be made within the spirit and scope of the present invention. Therefore, to apprise the public of the scope of the present invention, the following claims are made.

What is claimed is:

1. A decoding apparatus for decoding an input signal which includes a code stream and data having time management information about decoding of the code stream, comprising:
   buffering means for buffering the input signal;
   decoding means for reading out the input signal from said buffering means, decoding the input signal, and writing decoded data in a predetermined memory;
   output means for outputting the decoded data from the predetermined memory; and
   control means for controlling said buffering means and said decoding means on the basis of the time management information,
   wherein said control means checks a time necessary for decoding from the time management information, checks whether processing ends within a limit time, and when the time reaches the limit time before processing of all data ends, controls said decoding means to write decoded data in the predetermined memory, and
   wherein, when the time reaches the limit time before processing of all data ends, said control means checks whether the decoded data has an image quality not lower than a preset lowest image quality and, if the image quality is not higher than the lowest image quality, newly adds time management information to add a processing time of next data to a processing time of current data, and discards the next data.

2. The apparatus according to claim 1, wherein said decoding means reads out data from said buffering means in accordance with priority set by said control means, decodes the data, and writes the data at a position having the same priority in the predetermined memory.

3. The apparatus according to claim 2, wherein said decoding means uses as a processing unit a tile obtained by dividing a frame at a predetermined size.

4. The apparatus according to claim 3, wherein the priority set by said control means is determined to be high at a tile of each frame near a center of a screen.

5. The apparatus according to claim 2, wherein the priority set by said control means is determined to change for each frame so as to prevent priority at the same position from being the same between successive frames.

6. The apparatus according to claim 1, wherein when the time reaches the limit time before processing of all data ends, said output means outputs the decoded data written in the predetermined memory with an image size corresponding to a size of the written data.

7. The apparatus according to claim 1, further comprising lowest image quality setting means for setting the lowest image quality.

8. The apparatus according to claim 7, wherein said lowest image quality setting means sets the lowest image quality in accordance with processing performance of said decoding means.

9. The apparatus according to claim 8, wherein said lowest image quality setting means sets the lowest image quality on the basis of relationship between the processing performance of said decoding means and a designated playback speed.

10. The apparatus according to claim 9, wherein
the apparatus further comprises a first table representing the relationship between the playback speed and the lowest image quality, and
said lowest image quality setting means sets the lowest image quality corresponding to the designated playback speed with reference to the first table.

11. A decoding apparatus for decoding an input signal which includes a code stream and data having time management information about decoding of the code stream, comprising:
buffering means for buffering the input signal;
decoding means for reading out the input signal from said buffering means, decoding the input signal, and writing decoded data in a predetermined memory;
output means for outputting the decoded data from the predetermined memory; and
control means for controlling said buffering means and said decoding means on the basis of the time management information,
wherein said control means checks a time necessary for decoding from the time management information, checks whether processing ends within a limit time, and when the time reaches the limit time before processing of all data ends, controls said decoding means to write decoded data in the predetermined memory, and
wherein, when the time reaches the limit time before processing of all data ends, said control means checks whether the decoded data has an image size not smaller than a preset smallest image size and, if the image size is not larger than the smallest image size, newly adds time management information to add a processing time of next data to a processing time of current data, and discards the next data.

12. The apparatus according to claim 11, further comprising smallest image size setting means for setting the smallest image size.

13. The apparatus according to claim 12, wherein said smallest image size setting means sets the smallest image size in accordance with processing performance of said decoding means.

14. The apparatus according to claim 13, wherein said smallest image size setting means sets the smallest image size on the basis of relationship between the processing performance of said decoding means and a designated playback speed.

15. The apparatus according to claim 14, wherein
the apparatus further comprises a second table representing the relationship between the playback speed and the smallest image size, and
said smallest image size setting means sets the smallest image size corresponding to the designated playback speed with reference to the second table.

16. A method of controlling a decoding apparatus for decoding an input signal which includes a code stream and data having time management information about decoding of the code stream, comprising:
a buffering step, of buffering the input signal in a predetermined buffer;
a decoding step, of reading out the input signal from the predetermined buffer, decoding the input signal, and writing decoded data in a predetermined memory;
a output step, of outputting the decoded data from the predetermined memory; and
a control step, of controlling at least one of said buffering step, said decoding step, and said output step on the basis of the time management information,
wherein said control step includes determining a time necessary for decoding from the time management information, checking whether processing ends within a limit time, and when the time reaches the limit time before processing of all data ends, controlling said decoding step to write decoded data in the predetermined memory, and
wherein said control step further includes, when the time reaches the limit time before processing of all data ends, checking whether the decoded data has an image quality not lower than a preset lowest image quality and, if the image quality is not higher than the lowest image quality, newly adding time management information to add a processing time of next data to a processing time of current data, and discarding the next data.

17. The method according to claim 16, wherein in said decoding step, data is read out from said buffering step in accordance with priority set in said control step, decoded, and written at a position having the same priority in the predetermined memory.

18. The method according to claim 17, wherein in said decoding step, a tile obtained by dividing a frame at a predetermined size is used as a processing unit.

19. The method according to claim 18, wherein the priority set in said control step is determined to be high at a tile of each frame near a center of a screen.

20. The method according to claim 17, wherein the priority set in said control step is determined to change for each frame so as to prevent priority at the same position from being the same between successive frames.

21. The method according to claim 16, wherein in said output step, when the time reaches the limit time before processing of all data ends, the decoded data written in the predetermined memory are output with an image size corresponding to a size of the written data.

22. The method according to claim 16, further comprising a lowest image quality setting steps, of setting the lowest image quality.

23. The method according to claim 22, wherein in said lowest image quality setting step, the lowest image quality is set in accordance with processing performance of said decoding step.

24. The method according to claim 23, wherein in said lowest image quality setting step, the lowest image quality is set on the basis of the relationship between the processing performance of said decoding step and a designated playback speed.

25. The method according to claim 24, wherein in said lowest image quality setting step, the lowest image quality corresponding to the designated playback speed is set with reference to a first table representing the relationship between the playback speed and the lowest image quality.

26. A method of controlling a decoding apparatus for decoding an input signal which includes a code stream and data having time management information about decoding of the code stream, comprising:
a buffering step, of buffering the input signal in a predetermined buffer;
a decoding step, of reading out the input signal from the predetermined buffer, decoding the input signal, and writing decoded data in a predetermined memory;

a output step, of outputting the decoded data from the predetermined memory; and a control step, of controlling at least one of said buffering step, said decoding step, and said output step on the basis of the time management information, wherein said control step includes determining a time necessary for decoding from the time management information, checking whether processing ends within a limit time, and when the time reaches the limit time before processing of all data ends, controlling said decoding step to write decoded data in the predetermined memory, and wherein said control step further includes, when the time reaches the limit time before processing of all data ends, determining whether the decoded data has an image size not smaller than a preset smallest image size and, if the image size is not larger than the smallest image size, newly adding time management information to add a processing time of next data to a processing time of current data, and discarding the next data.

27. The method according to claim 26, further comprising a smallest image size setting steps of setting the smallest image size.

28. The method according to claim 27, wherein in said smallest image size setting step, the smallest image size is set in accordance with a processing performance of said decoding step.

29. The method according to claim 28, wherein in said smallest image size setting step, the smallest image size is set on the basis of the relationship between the processing performance of said decoding step and a designated playback speed.

30. The method according to claim 29, wherein in said smallest image size setting step, the smallest image size corresponding to the designated playback speed is set with reference to a second table representing the relationship between the playback speed and the smallest image size.

31. A computer readable storage medium which stores executable program codes functioning as a decoding apparatus for decoding an input signal which includes a code stream and data having time management information about decoding of the code stream, comprising:

program code of a buffering step, of buffering the input signal in a predetermined buffer;

program code of a decoding step, of reading out the input signal from the predetermined buffer, decoding the input signal, and writing decoded data in a predetermined memory;

program code of an output step, of outputting the decoded data from the predetermined memory; and program code of a control step, of controlling at least one of the buffering step, the decoding step, and the output step on the basis of the time management information, wherein the control step includes determining a time necessary for decoding from the time management information, checking whether processing ends within a limit time, and when the time reaches the limit time before processing of all data ends, controlling execution of said program code of the decoding step to write decoded data in the predetermined memory, and wherein the control step further includes, when the time reaches the limit time before processing of all data ends, checking whether the decoded data has an image quality not lower than a preset lowest image quality and, if the image quality is not higher than the lowest image quality, newly adding time management information to add a processing time of next data to a processing time of current data, and discarding the next data.

* * * * *

UNITED STATES PATENT AND TRADEMARK OFFICE
CERTIFICATE OF CORRECTION

PATENT NO. : 7,072,404 B2
APPLICATION NO. : 09/836252
DATED : July 4, 2006
INVENTOR(S) : Osamu Itokawa It is certified that error appears in the above-identified patent and that said Letters Patent is hereby corrected as shown below:

COLUMN 1

Line 56, "a output" should read --an output--.

COLUMN 3

Line 39, "decoding processing of" should be deleted.

COLUMN 12

Line 59, "In the case," should read --In this case,--.

COLUMN 16

Line 27, "the case," should read --this case,--;

COLUMN 20

Line 1, "a output" should read --an output--; and
Line 43, "steps," should read --step,--.

COLUMN 21

Line 1, "a output" should read --an output--; and
Line 22, "steps" should read --step,--.

Signed and Sealed this

Twenty-sixth Day of August, 2008

JON W. DUDAS
*Director of the United States Patent and Trademark Office*